(12) United States Patent
Hoshi

(10) Patent No.: US 10,020,553 B2
(45) Date of Patent: Jul. 10, 2018

(54) FUEL CELL SYSTEM AND METHOD FOR CONTROLLING FUEL CELL SYSTEM

(71) Applicant: NISSAN MOTOR CO., LTD., Yokohama-shi, Kanagawa (JP)

(72) Inventor: Kiyoshi Hoshi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/027,107

(22) PCT Filed: Sep. 18, 2014

(86) PCT No.: PCT/JP2014/074728
§ 371 (c)(1),
(2) Date: Apr. 4, 2016

(87) PCT Pub. No.: WO2015/053060
PCT Pub. Date: Apr. 16, 2015

(65) Prior Publication Data
US 2016/0240904 A1    Aug. 18, 2016

(30) Foreign Application Priority Data
Oct. 8, 2013  (JP) ................................ 2013-211314

(51) Int. Cl.
*H01M 16/00*   (2006.01)
*H01M 8/04029*   (2016.01)
(Continued)

(52) U.S. Cl.
CPC ..... *H01M 16/006* (2013.01); *H01M 8/04029* (2013.01); *H01M 8/04037* (2013.01);
(Continued)

(58) Field of Classification Search
CPC ........... H01M 8/04268; H01M 16/006; H01M 8/04302; H01M 8/04029; H01M 8/04037;
(Continued)

(56) References Cited

U.S. PATENT DOCUMENTS

| 8,384,342 | B2 | 2/2013 | Hasegawa |
| 2008/0248351 | A1 | 10/2008 | Wake et al. |
| 2010/0320960 | A1* | 12/2010 | Hasegawa ......... H01M 8/04037 320/101 |

FOREIGN PATENT DOCUMENTS

| CA | 2 700 606 A1 | 4/2009 |
| JP | 7-94202 A | 4/1995 |

(Continued)

OTHER PUBLICATIONS

Pesaran, Ahmad et al., "Fuel cell freeze investigation," Milestone Report NREL/MP-540-38760, Sep. 1, 2005, pp. 23-34, XP55407389.

*Primary Examiner* — Rexford Barnie
*Assistant Examiner* — Thai Tran
(74) *Attorney, Agent, or Firm* — Foley & Lardner LLP

(57) ABSTRACT

A fuel cell system includes a battery, auxiliary machines including an actuator and a heater that heats cooling water circulating in the fuel cell. The actuator is driven to cause gas to be supplied to a fuel cell configured to generate electric power using the gas. Furthermore, the fuel cell system includes a warming-up operation unit that adjusting operations of the auxiliary machines so as to realize output of fuel cell such that a predetermined electric power is extracted, a discharge control unit that supplies the electric power from the battery to the auxiliary machines when electric power generated by the fuel cell is lower than electric power consumed by the auxiliary machines. Furthermore, the fuel cell system includes an auxiliary machine restriction unit that restricts electric power consumed by the (Continued)

actuator when the discharge control unit supplies the electric power from the battery to the auxiliary machines in a case where the fuel cell is warmed up using the heater.

7 Claims, 11 Drawing Sheets

(51) Int. Cl.
| | |
|---|---|
| H01M 8/04223 | (2016.01) |
| H01M 8/0438 | (2016.01) |
| H01M 8/04828 | (2016.01) |
| H01M 8/04007 | (2016.01) |
| H01M 8/04537 | (2016.01) |
| H01M 8/04746 | (2016.01) |
| H01M 8/04302 | (2016.01) |
| H01M 8/04119 | (2016.01) |
| H01M 8/04298 | (2016.01) |
| H02J 7/00 | (2006.01) |

(52) U.S. Cl.
CPC ... *H01M 8/04141* (2013.01); *H01M 8/04268* (2013.01); *H01M 8/04298* (2013.01); *H01M 8/04302* (2016.02); *H01M 8/04395* (2013.01); *H01M 8/04619* (2013.01); *H01M 8/04753* (2013.01); *H01M 8/04947* (2013.01); *H02J 7/0063* (2013.01); *H01M 2250/20* (2013.01); *H02J 2007/0067* (2013.01); *Y02T 90/32* (2013.01)

(58) Field of Classification Search
CPC ......... H01M 8/04141; H01M 8/04298; H01M 8/04395; H01M 8/04619; H01M 8/04753; H01M 8/04947; H01M 2250/20; H02J 7/0063; H02J 2007/0067; Y02T 90/03
See application file for complete search history.

(56) References Cited

FOREIGN PATENT DOCUMENTS

| | | |
|---|---|---|
| JP | 2001-236978 A | 8/2001 |
| JP | 2004-247164 A | 9/2004 |
| JP | 2007-188825 A | 7/2007 |
| JP | 2008-258072 A | 10/2008 |
| JP | 2009-4243 A | 1/2009 |
| JP | 2009-200005 A | 9/2009 |

\* cited by examiner

FUEL CELL SYSTEM AND METHOD FOR CONTROLLING FUEL CELL SYSTEM

TECHNICAL FIELD

The present invention relates to a fuel cell system that warms up a fuel cell, and a method of controlling the fuel cell system.

BACKGROUND ART

It is generally considered that a temperature range of a fuel cell appropriate for electric power generation is around 70° C. Therefore, upon activation of a fuel cell system, it is desirable to quickly increase the temperature of the fuel cell to the temperature range appropriate for electric power generation.

JP 2009-4243A discloses a fuel cell system that reduces a warming-up period of a fuel cell by utilizing self-heat generation attributed to electric power generation by the fuel cell itself.

SUMMARY OF INVENTION

In fuel cell systems that are currently developed, upon activation at a subzero temperature, electric power generated by a fuel cell is consumed by auxiliary machines, such as a heater that heats cooling water for the fuel cell, and a compressor that supplies cathode gas to the fuel cell by driving an actuator. As a result, the fuel cell is warmed up promptly by self-heat generation associated with the electric power generation, and by heating via cooling water.

During warming-up of the fuel cell, the fuel cell has a poor I-V characteristic, and output of the fuel cell is unstable; therefore, there may be a shortage in the electric power generated by the fuel cell relative to a predetermined electric power consumed by the auxiliary machines. In this case, a converter connected between the fuel cell and a battery adjusts the voltage of the fuel cell or the battery so as to supply electric power corresponding to the shortage from the battery to the auxiliary machines.

However, continuous discharge of electric power from the battery to the auxiliary machines results in over-discharge of the battery. One example of solutions to this issue is to restrict electric power supplied from the battery to the heater to low power. However, this gives rise to the problem that warming-up of the fuel cell takes long due to a reduction in the amount of heat applied by the heater to cooling water.

The present invention has been made in view of the above problems, and aims to provide a fuel cell system that promptly warms up a fuel cell while suppressing over-discharge of a battery, and a method of controlling the fuel cell system.

According to one aspect of the present invention, a fuel cell system includes a battery configured to reserve electric power, auxiliary machines including an actuator and a heater. The actuator is driven to cause gas to be supplied to a fuel cell configured to generate electric power using the gas, and the heater heats cooling water circulating in the fuel cell. Furthermore, the fuel cell system includes a warming-up operation unit configured to adjust operations of the auxiliary machines so as to realize output of fuel cell such that a predetermined electric power is extracted, a discharge control unit configured to supply the electric power from the battery to the auxiliary machines when electric power generated by the fuel cell is lower than electric power consumed by the auxiliary machines. Furthermore, the fuel cell system includes an auxiliary machine restriction unit configured to restrict electric power consumed by the actuator when the discharge control unit supplies the electric power from the battery to the auxiliary machines in a case where the fuel cell is warmed up using the heater.

DESCRIPTION OF EMBODIMENTS

Embodiments of the present invention will be described below with reference to the drawings and the like.

First Embodiment

Figure 1:
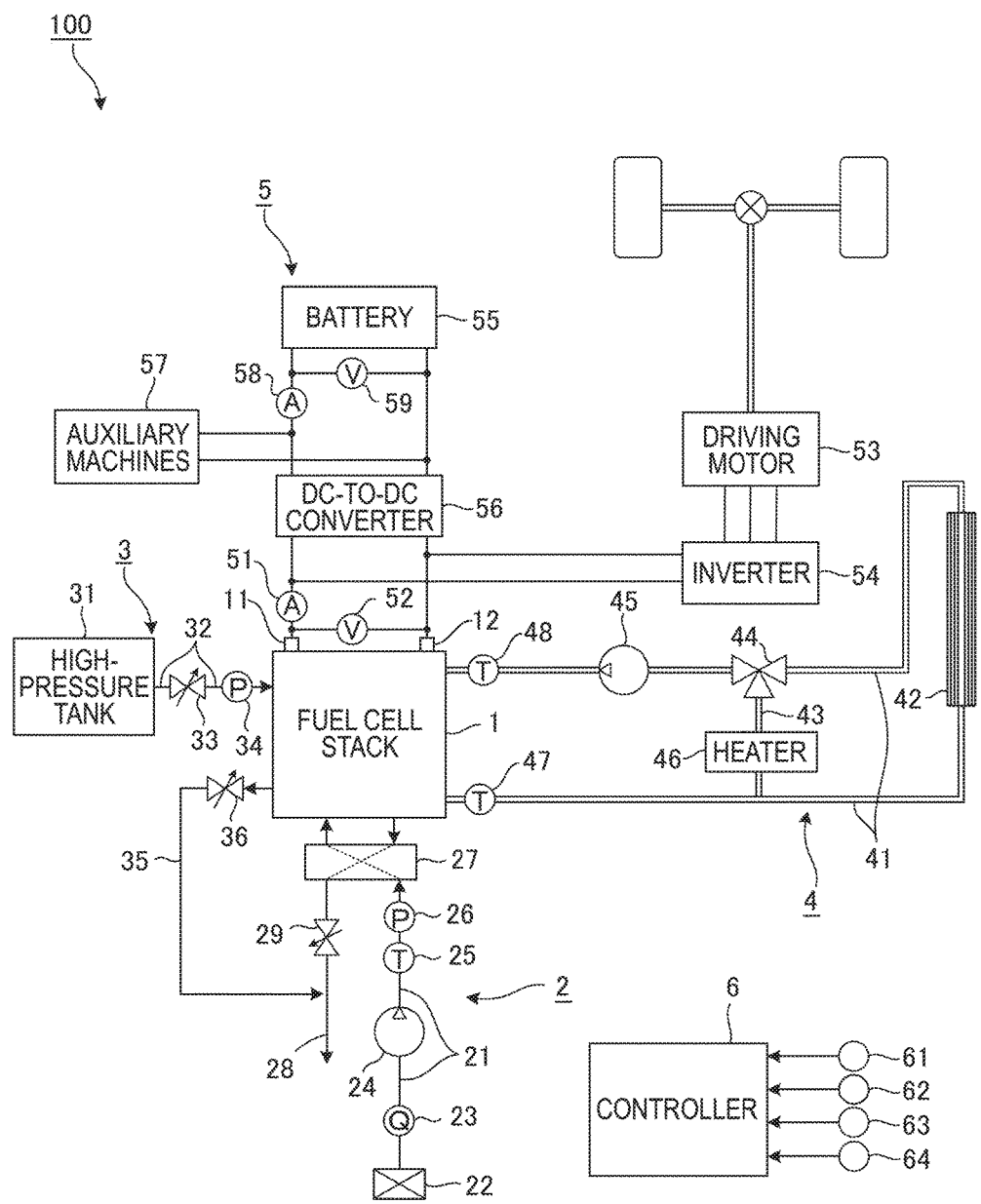
FIG. 1 shows a configuration of a fuel cell system according to a first embodiment of the present invention.

FIG. 1 shows a configuration of a fuel cell system 100 according to a first embodiment of the present invention.

The fuel cell system 100 is a power supply system that supplies cathode gas and anode gas from outside to a fuel cell stack 1, and causes the fuel cell stack 1 to generate electric power in accordance with loads. In the present embodiment, the fuel cell system 100 supplies the electric power generated by the fuel cell stack 1 to the loads, such as a driving motor 53 that drives a vehicle.

The fuel cell system 100 includes the fuel cell stack 1, a cathode gas supply/discharge apparatus 2, an anode gas supply/discharge apparatus 3, a stack cooling apparatus 4, an electric power system 5, and a controller 6.

The fuel cell stack 1 is a stacked battery made by stacking several hundred fuel cells, or so-called battery cells. The fuel cell stack 1 generates electric power using anode gas and cathode gas supplied thereto. The fuel cell stack 1 has an anode electrode output terminal 11 and a cathode electrode output terminal 12 as terminals via which the electric power is extracted.

Each fuel cell is composed of an anode electrode (fuel electrode), a cathode electrode (oxidant electrode), and an electrolyte membrane interposed between the anode electrode and the cathode electrode. In each fuel cell, an electrochemical reaction is brought about at the electrolyte membrane using anode gas (fuel gas) containing hydrogen at the anode electrode, and cathode gas (oxidant gas) containing oxygen at the cathode electrode. The following electrochemical reactions proceed in the anode electrode and the cathode electrode.

Anode electrode: $2H_2 \rightarrow 4H^+ + 4e^-$ (1)

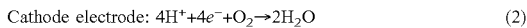

Cathode electrode: $4H^+ + 4e^- + O_2 \rightarrow 2H_2O$ (2)

In each fuel cell, the foregoing electrochemical reactions (1) and (2) generate an electromotive force and water. In the fuel cell stack 1, the stacked fuel cells are connected in series. Thus, the sum of cell voltages generated in the fuel cells is the output voltage of the fuel cell stack 1 (e.g., several hundred volts).

The cathode gas supply/discharge apparatus 2 and the anode gas supply/discharge apparatus 3 supply cathode gas and anode gas, respectively, to the fuel cell stack 1.

The cathode gas supply/discharge apparatus 2 supplies cathode gas to the fuel cell stack 1, and discharges cathode off-gas discharged from the fuel cell stack 1 to the outer air.

The cathode gas supply/discharge apparatus 2 includes a cathode gas supply passage 21, a filter 22, a cathode flow rate sensor 23, a cathode compressor 24, a temperature sensor 25, and a cathode pressure sensor 26. The cathode gas supply/discharge apparatus 2 also includes a water recovery device (hereinafter referred to as "WRD") 27, a cathode gas discharge passage 28, and a cathode pressure regulator valve 29.

Cathode gas to be supplied to the fuel cell stack 1 flows in the cathode gas supply passage 21. The cathode gas supply passage 21 is connected to the filter 22 at one end, and to a cathode gas inlet hole of the fuel cell stack 1 at the other end.

The filter 22 removes foreign substances in cathode gas to be introduced into the cathode gas supply passage 21.

The cathode flow rate sensor 23 is provided in the cathode gas supply passage 21 so as to be located upstream relative to the cathode compressor 24. The cathode flow rate sensor 23 detects the flow rate of cathode gas that is supplied to the cathode compressor 24, and then eventually to the fuel cell stack 1.

The cathode compressor 24 is provided in the cathode gas supply passage 21. The cathode compressor 24 introduces the air from outside into the cathode gas supply passage 21 via the filter 22, and supplies that air to the fuel cell stack 1 as cathode gas. That is to say, the cathode compressor 24 is equivalent to an actuator that is driven to supply the air to the fuel cell stack 1.

The temperature sensor 25 is provided in the cathode gas supply passage 21 so as to be located between the cathode compressor 24 and the WRD 27. The temperature sensor 25 detects the temperature at a cathode gas inlet side of the WRD 27.

The cathode pressure sensor 26 is provided in the cathode gas supply passage 21 so as to be located between the cathode compressor 24 and the WRD 27. The cathode pressure sensor 26 detects the pressure at the cathode gas inlet side of the WRD 27 (hereinafter referred to as "WRD inlet pressure"). A value detected by the cathode pressure sensor 26 is outputed to the controller 6.

The WRD 27 is connected to both of the cathode gas supply passage 21 and the cathode gas discharge passage 28, recovers water in cathode off-gas flowing in the cathode gas discharge passage 28, and humidifies cathode gas flowing in the cathode gas supply passage 21 with the recovered water.

Cathode off-gas that has been discharged from the fuel cell stack 1 flows in the cathode gas discharge passage 28.

The cathode gas discharge passage 28 is connected to a cathode gas outlet hole of the fuel cell stack 1 at one end, and is open at the other end.

The cathode pressure regulator valve 29 is provided in the cathode gas discharge passage 28. The cathode pressure regulator valve 29 adjusts the pressure of cathode gas to be supplied to the fuel cell stack 1. The cathode pressure regulator valve 29 is controlled by the controller 6. For example, the cathode pressure regulator valve 29 increases the cathode gas pressure to increase the electric power consumed by the cathode compressor 24.

The anode gas supply/discharge apparatus 3 supplies anode gas to the fuel cell stack 1 and discharges, to the cathode gas discharge passage 28, anode off-gas that has been discharged from the fuel cell stack 1. The anode gas supply/discharge apparatus 3 includes a high-pressure tank 31, an anode gas supply passage 32, an anode pressure regulator valve 33, an anode pressure sensor 34, an anode gas discharge passage 35, and a purge valve 36.

The high-pressure tank 31 reserves anode gas to be supplied to the fuel cell stack 1 while maintaining the same in a high-pressure state.

Anode gas is supplied from the high-pressure tank 31 to the fuel cell stack 1 via the anode gas supply passage 32. The anode gas supply passage 32 is connected to the high-pressure tank 31 at one end, and to an anode gas inlet hole of the fuel cell stack 1 at the other end.

The anode pressure regulator valve 33 is provided in the anode gas supply passage 32. The anode pressure regulator valve 33 is controlled to open/close by the controller 6, and adjusts the pressure of anode gas ejected from the high-pressure tank 31 to a desired pressure.

The anode pressure sensor 34 is provided in the anode gas supply passage 32 so as to be located downstream relative to the anode pressure regulator valve 33. The anode pressure sensor 34 detects the pressure of anode gas that flows to the anode gas inlet hole of the fuel cell stack 1. A value detected by the anode pressure sensor 34 is output to the controller 6.

Anode off-gas that has been discharged from the fuel cell stack 1 flows in the anode gas discharge passage 35. The anode gas discharge passage 35 is connected to an anode gas outlet hole of the fuel cell stack 1 at one end, and to the cathode gas discharge passage 28 at the other end.

The purge valve 36 is provided in the anode gas discharge passage 35. The purge valve 36 is controlled to open/close by the controller 6, and controls the flow rate of anode off-gas discharged from the anode gas discharge passage 35 to the cathode gas discharge passage 28.

The stack cooling apparatus 4 cools the fuel cell stack 1 with cooling water, and maintains the fuel cell stack 1 at a temperature appropriate for the electric power generation.

The stack cooling apparatus 4 includes a cooling water circulation passage 41, a radiator 42, a bypass passage 43, a three-way valve 44, a circulation pump 45, a cooling water heater 46, a first water temperature sensor 47, and a second water temperature sensor 48.

Cooling water for cooling the fuel cell stack 1 circulates in the cooling water circulation passage 41.

The radiator 42 is provided in the cooling water circulation passage 41, and cools the cooling water that has been discharged from the fuel cell stack 1.

The bypass passage 43 diverges from the cooling water circulation passage 41, and is connected to the three-way valve 44 in such a manner that it bypasses the radiator 42. The bypass passage 43 allows cooling water to circulate to the fuel cell stack 1 without making the same flow through the radiator 42.

The three-way valve 44 is provided in the cooling water circulation passage 41 so as to be located downstream relative to the radiator 42. The three-way valve 44 switches between circulation paths of cooling water in accordance with the temperature of cooling water.

When the temperature of cooling water is relatively high, the three-way valve 44 switches between the circulation paths of cooling water so that cooling water discharged from the fuel cell stack 1 is re-supplied to the fuel cell stack 1 via the radiator 42. Conversely, when the temperature of cooling water is relatively low, the three-way valve 44 switches between the circulation paths of cooling water so that cooling water discharged from the fuel cell stack 1 skips the radiator 42, that is to say, flows in the bypass passage 43 to be re-supplied to the fuel cell stack 1.

The circulation pump 45 is provided in the cooling water circulation passage 41 so as to be located downstream relative to the three-way valve 44, and circulates cooling water.

The cooling water heater 46 is provided in the bypass passage 43. The fuel cell stack 1 applies electric power to the cooling water heater 46 during warming-up of the fuel cell stack 1 so as to increase the temperature of cooling water.

The first water temperature sensor 47 is provided in the cooling water circulation passage 41 so as to be located upstream relative to the radiator 42. The first water temperature sensor 47 detects the temperature of cooling water that has been discharged from the fuel cell stack 1 (hereinafter referred to as "stack outlet water temperature").

The second water temperature sensor 48 is provided in the cooling water circulation passage 41 so as to be located between the circulation pump 45 and the fuel cell stack 1. The second water temperature sensor 48 detects the temperature of cooling water to be supplied to the fuel cell stack 1 (hereinafter referred to as "stack inlet water temperature").

The electric power system 5 includes a stack current sensor 51, a stack voltage sensor 52, the driving motor 53, an inverter 54, a battery 55, a DC-to-DC converter 56, auxiliary machines 57, a battery current sensor 58, and a battery voltage sensor 59.

The stack current sensor 51 is connected to the anode electrode output terminal 11, and detects the output current extracted from the fuel cell stack 1.

The stack voltage sensor 52 detects an inter-terminal voltage between the anode electrode output terminal 11 and the cathode electrode output terminal 12 (hereinafter referred to as "output voltage"). Note that the battery voltage sensor 59 may detect the voltages of the battery cells stacked in the fuel cell stack 1.

The driving motor 53 is a three-phase alternating-current synchronous motor including a rotor with an embedded permanent magnet, and a circumferential stator having teeth. The teeth are arranged at an equal interval, and a coil is wound around each tooth. The driving motor 53 has functions of an electric motor that is rotated and driven by receiving the electric power supplied from the fuel cell stack 1 and the battery 55, as well as functions of an electric generator that generates an electromotive force or a so-called regenerative electric power at both ends of the coils by rotating the rotor using an external force when the vehicle decelerates.

The inverter 54 is composed of a plurality of semiconductor switches, such as insulated-gate bipolar transistors (IGBTs). The controller 6 performs switching control on the semiconductor switches of the inverter 54 so as to convert direct-current electric power into alternating-current electric power, or vice versa.

In order to cause the driving motor 53 to function as the electric motor, the inverter 54 converts the direct-current electric power generated by combining the generated electric power extracted from the fuel cell stack 1 and the discharge electric power discharged from the battery 55 into three-phase alternating-current electric power, and supplies the three-phase alternating-current electric power to the driving motor 53. On the other hand, in order to cause the driving motor 53 to function as the electric generator, the inverter 54 converts the regenerative electric power (three-phase alternating-current electric power) of the driving motor 53 into direct-current electric power, and supplies the direct-current electric power to the battery 55.

The battery 55 is a secondary battery that reserves electric power, and is realized by, for example, a lithium-ion battery. The battery 55 is charged with the regenerative electric power of the driving motor 53 or the electric power generated by the fuel cell stack 1. The electric power with which the battery 55 has been charged is supplied to the auxiliary machines 57 and the driving motor 53 as needed.

The DC-to-DC converter 56 is a bidirectional voltage converter that adjusts one of the voltage of fuel cell stack 1 and the voltage of the battery 55. One voltage terminal of the DC-to-DC converter 56 is connected to the fuel cell stack 1, whereas the other voltage terminal of the DC-to-DC converter 56 is connected to the battery 55.

The DC-to-DC converter 56 increases or reduces the voltage generated at its voltage terminal connected to the fuel cell stack 1 using the electric power of the battery 55. The DC-to-DC converter 56 controls the output voltage of the fuel cell stack 1, and adjusts the output current of the fuel cell stack 1 and the electric power generated by the fuel cell stack 1 (output current×output voltage). That is to say, the DC-to-DC converter 56 is a power management (PM) circuit used to manage the electric power generated by the fuel cell stack 1.

The auxiliary machines 57 represent a collection of control devices provided for the operations of the fuel cell stack 1. The auxiliary machines 57 include the cathode compressor 24, the circulation pump 45, the cooling water heater 46, and the like.

The auxiliary machines 57 are connected in parallel between the battery 55 and the DC-to-DC converter 56. With the use of the DC-to-DC converter 56, electric power is supplied from the battery 55 or the fuel cell stack 1 to the auxiliary machines 57.

The battery current sensor 58 is connected to a positive electrode terminal of the battery 55, and detects the current discharged from the battery 55.

The battery voltage sensor 59 detects an inter-terminal voltage between the positive electrode terminal and a negative electrode terminal of the battery 55.

The controller 6 is composed of a microcomputer provided with a central processing unit (CPU), a read-only memory (ROM), a random-access memory (RAM), and an input/output interface (I/O interface).

The controller 6 receives, as input, detection signals from the aforementioned first water temperature sensor 47, second water temperature sensor 48, stack current sensor 51, stack voltage sensor 52, battery current sensor 58, and battery voltage sensor 59. The controller 6 also receives, as input, detection signal from various types of sensors that are necessary for controlling the fuel cell system 100.

Other sensors include an atmospheric pressure sensor 61, an SOC sensor 62, a key sensor 63, and an acceleration stroke sensor 64. The atmospheric pressure sensor 61 is provided inside a vehicle cabin and detects the atmospheric pressure. The SOC sensor 62 is provided to the battery 55 and detects the state of charge (SOC) of the battery 55. The key sensor 63 detects a start request and a stop request for the fuel cell system 100 on the basis of on/off of a start key. The acceleration stroke sensor 64 detects a depression amount of an accelerator pedal.

The controller 6 causes the fuel cell stack 1 to generate electric power efficiently using input signals from various types of sensors and instruction values for control devices and the like in the fuel cell system 100.

For example, the controller 6 controls the cathode compressor 24, the cathode pressure regulator valve 29, the anode pressure regulator valve 33, and the purge valve 36 in accordance with the electric power required by the loads, such as the driving motor 53 and the auxiliary machines 57. Consequently, the flow rates of cathode gas and anode gas supplied to the fuel cell stack 1 are adjusted to the flow rates appropriate for the electric power generation.

A description is now given of a functional configuration of the controller 6 that controls the fuel cell system 100.

Figure 2:
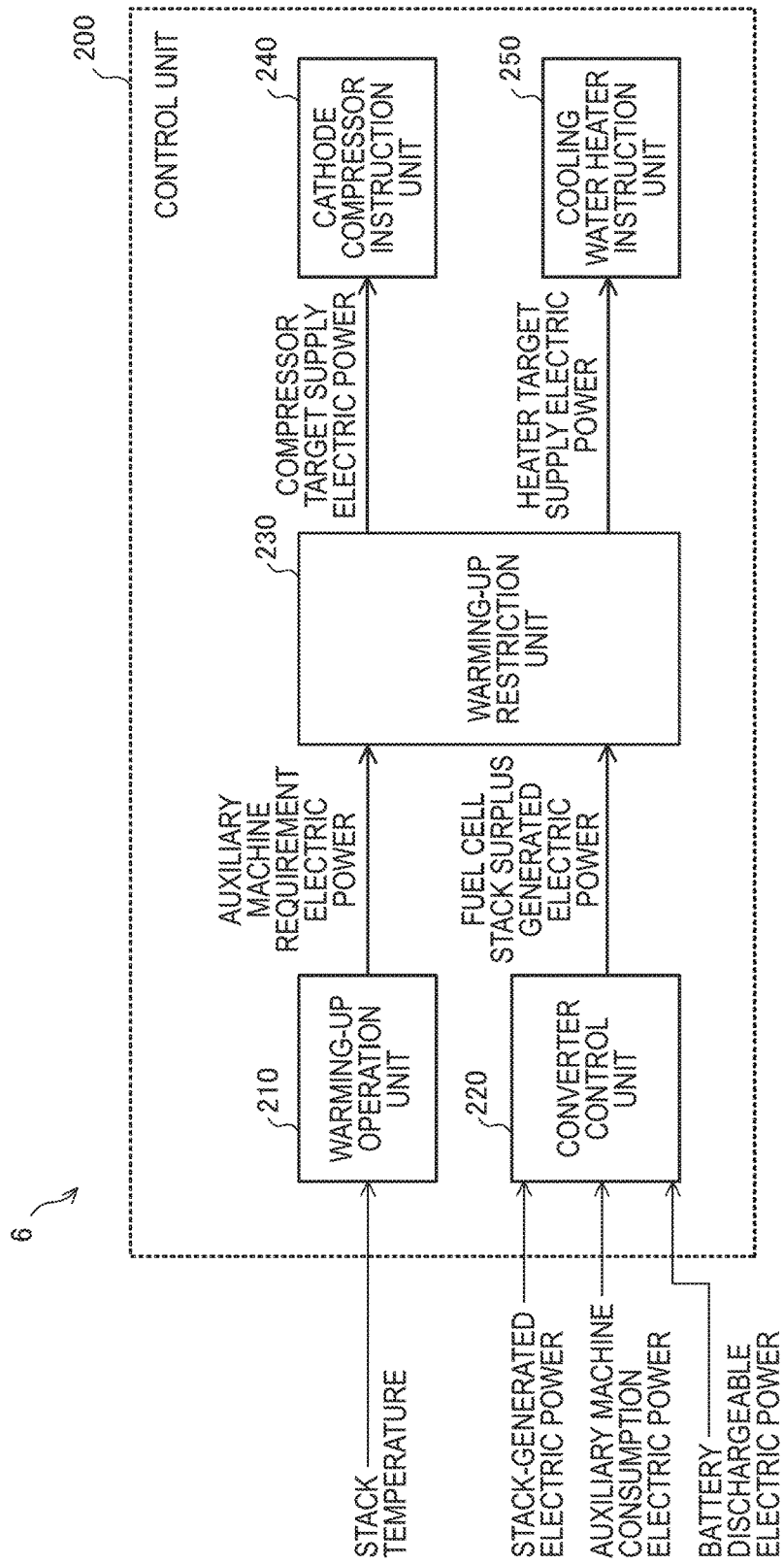
FIG. 2 is a block diagram showing a functional configuration of a controller.

FIG. 2 is a functional block diagram showing an example of a control unit 200 composing the controller 6.

When the fuel cell system 100 is activated, the control unit 200 performs warming-up control for warming-up the fuel cell stack 1 to a temperature appropriate for the electric power generation (hereinafter referred to as "warming-up facilitation operation").

In the warming-up facilitation operation, the control unit 200 electrically connects the fuel cell stack 1 to the auxiliary machines 57, and causes the fuel cell stack 1 to generate electric power necessary for driving the auxiliary machines 57. As a result, the fuel cell stack 1 itself is warmed up by its self-heat generation associated with its electric power generation. The electric power generated by the fuel cell stack 1 is supplied to, for example, the cathode compressor 24, the circulation pump 45, the cooling water heater 46, and the like.

After the vehicle is permitted to run, the control unit 200 supplies the generated electric power from the fuel cell stack 1 to both of the driving motor 53 and the auxiliary machines 57. If there is a shortage in the electric power generated by the fuel cell stack 1 relative to the electric power required by the driving motor 53 and the auxiliary machines 57, the generated electric power is preferentially allocated to the driving motor 53. If there is a shortage in the electric power supplied to the auxiliary machines 57, the shortage is supplemented by electric power from the battery 55.

When performing the warming-up facilitation operation, the control unit 200 sets the rotation speed of the circulation pump 45 to an upper limit value of a variable range, and sets the output of the cooling water heater 46 (i.e., the amount of heat generation by the cooling water heater 46) to an upper limit value of a variable range. Consequently, the fuel cell stack 1 is warmed up also by cooling water that has been heated by the cooling water heater 46. Furthermore, as the electric power consumed by the circulation pump 45 and the cooling water heater 46 increases, the electric power generated by the fuel cell stack 1 increases, and the amount of self-heat generation by the fuel cell stack 1 increases as well. Thus, warming-up of the fuel cell stack 1 is further facilitated.

By performing the foregoing warming-up facilitation operation, a warming-up period from the activation of the fuel cell system 100 to the completion of warming-up of the fuel cell stack 1 can be shortened.

The control unit 200 includes a warming-up operation unit 210, a converter control unit 220, a warming-up restriction unit 230, a cathode compressor instruction unit 240, and a cooling water heater instruction unit 250.

When the fuel cell system 100 is activated, the warming-up operation unit 210 determines whether the temperature of the fuel cell stack 1 is lower than a predetermined warming-up threshold (e.g., 50° C.). If the warming-up operation unit 210 determines that the temperature of the fuel cell stack 1 is lower than the warming-up threshold, it starts the warming-up facilitation operation so that a predetermined electric power necessary for warming-up can be extracted from the fuel cell stack 1 by adjusting the electric power consumed by the auxiliary machines 57. Thereafter, when the temperature of the fuel cell stack 1 has increased to the warming-up threshold, the warming-up operation unit 210 ends the warming-up facilitation operation.

For example, the stack inlet water temperature or an average of the stack inlet water temperature and the stack outlet water temperature is used as the temperature of the fuel cell stack 1. On the other hand, if it is determined that the temperature of the fuel cell stack 1 is higher than the warming-up threshold, normal operation is performed so that the electric power required by the loads, such as the driving motor 53, can be extracted from the fuel cell stack 1.

When performing the warming-up facilitation operation, the warming-up operation unit 210 adjusts a requirement value of the electric power consumed by the auxiliary machines 57 (hereinafter referred to as "auxiliary machine requirement electric power") to the predetermined electric power necessary for warming-up of the fuel cell stack 1.

For example, the warming-up operation unit 210 sets a requirement value of each of the electric powers supplied to the cathode compressor 24 and the cooling water heater 46 to an upper limit value of a variable range. A requirement value of the electric power consumed by the circulation pump 45 is set to an upper limit value of a variable range so that cooling water is not boiled by the cooling water heater 46. A sum total of these requirement values is set as the auxiliary machine requirement electric power.

The converter control unit 220 computes a surplus generated electric power of the fuel cell stack 1 on the basis of the electric power generated by the fuel cell stack 1, auxiliary machine consumption electric power consumed by the auxiliary machines 57, and a battery dischargeable electric power.

Specifically, the converter control unit 220 calculates the surplus generated electric power of the fuel cell stack 1 by subtracting the auxiliary machine consumption electric power from the sum of the electric power generated by the fuel cell stack 1 and the battery dischargeable electric power.

One example method to obtain the electric power generated by the fuel cell stack 1 is to multiply the current detected by, for example, the stack current sensor 51 and the voltage detected by the stack voltage sensor 52.

The auxiliary machine consumption electric power is a sum total of the electric powers consumed by the auxiliary machines 57 and the DC-to-DC converter 56. The auxiliary machine consumption electric power is calculated on the basis of, for example, the electric power values detected by the stack current sensor 51 and the stack voltage sensor 52, the electric power values detected by the battery current sensor 58 and the battery voltage sensor 59, and the like.

The battery dischargeable electric power (battery suppliable electric power) is an electric power value that is set to prevent over-discharge of the battery 55, and is calculated on the basis of, for example, the state of charge of the battery 55 detected by the SOC sensor 62. For example, the smaller the state of charge detected by the SOC sensor 62, the smaller the set value of the battery dischargeable electric power.

In the present embodiment, the converter control unit 220 monitors whether the electric power generated by the fuel cell stack 1 has fallen below the auxiliary machine consumption electric power consumed by the auxiliary machines 57.

When the electric power generated by the fuel cell stack 1 is lower than the auxiliary machine consumption electric power, the converter control unit 220 determines whether the difference between the electric power generated by the fuel cell stack 1 and the auxiliary machine consumption electric power is lower than the battery dischargeable electric power.

For example, if the difference obtained by subtracting the electric power generated by the fuel cell stack 1 from the auxiliary machine consumption electric power is lower than the battery dischargeable electric power, the converter control unit 220 causes discharge of electric power from the battery 55 to the auxiliary machines 57. Specifically, the converter control unit 220 controls the voltage of the DC-to-DC converter 56 at the battery 55 side so that the current discharged from the battery 55 flows to the auxiliary machines 57.

In a case where electric power is supplied from the battery 55 to the auxiliary machines 57 through voltage control of the DC-to-DC converter 56, the converter control unit 220 causes discharge of electric power from the battery 55 to the auxiliary machines 57. The converter control unit 220 subtracts the auxiliary machine consumption electric power from the sum of the discharge electric power from the battery 55 and the electric power generated by the fuel cell stack 1, and outputs the result of the subtraction to the warming-up restriction unit 230 as the surplus generated electric power of the fuel cell stack 1.

On the basis of a warming-up requirement electric power set by the warming-up operation unit 210, the warming-up restriction unit 230 sets a target supply electric power to the cathode compressor 24 in the cathode compressor instruction unit 240, and sets a target supply electric power to the cooling water heater 46 in the cooling water heater instruction unit 250.

The target supply electric power to the cathode compressor 24 is calculated on the basis of a target value of the cathode gas flow rate (target flow rate), a value detected by the cathode flow rate sensor 23, a target value of the cathode gas pressure (target pressure), and a value detected by the cathode pressure sensor 26. For example, the target supply electric power to the cathode compressor 24 is set in such a manner that the difference between the target flow rate of cathode gas and the detected value of the cathode gas flow rate, as well as the difference between the target pressure of cathode gas and the detected value of the cathode gas pressure, matches zero.

When such a fuel cell system 100 is activated at a temperature equal to or lower than 0° C., the fuel cell stack 1 has a poor I-V (current-voltage) characteristic, and output of the fuel cell stack 1 is unstable; therefore, there may be a shortage in the electric power generated by the fuel cell stack 1 relative to the auxiliary machine consumption electric power necessary for warming-up. In this case, electric power corresponding to the shortage is supplied from the battery 55 to the auxiliary machines 57 through voltage control of the DC-to-DC converter 56.

In such a situation, if discharge from the battery 55 to the auxiliary machines 57 continues for a predetermined period or longer, the battery 55 undergoes over-discharge as the charging capacity of the battery 55 is limited.

The foregoing issue may be addressed by restricting the electric power supplied to the cooling water heater 46 first among the electric powers supplied to the auxiliary machines 57. However, this reduces the amount of heat supplied from the cooling water heater 46 to cooling water, and hence extends the warming-up period required for warming-up of the fuel cell stack 1.

On the other hand, if the electric power supplied to the circulation pump 45 is restricted before restricting the electric power supplied to the cooling water heater 46, circulation of cooling water deteriorates, the amount of heat exchanged between cooling water and the fuel cell stack 1 decreases, and the warming-up period is extended. Furthermore, deterioration in circulation of cooling water may have the risk of boiling of cooling water in the vicinity of the cooling water heater 46.

Meanwhile, the electric power supplied to the cathode compressor 24 during the warming-up facilitation operation is set to be high beyond necessity so as to increase the electric power generated by the fuel cell stack 1. The warming-up effect of increasing the temperature of the fuel cell stack 1 with such setting is smaller than the warming-up effect achieved by heating cooling water in multiple cycles with the cooling water heater 46 through circulation of cooling water.

In view of this, in the present embodiment, when electric power is discharged from the battery 55 to the auxiliary machines 57 during the warming-up facilitation operation (during warming-up), the warming-up restriction unit 230 restricts the electric power supplied to the cathode compressor 24 before restricting the electric power supplied to the cooling water heater 46.

Specifically, when the warming-up restriction unit 230 obtains a calculated value of the fuel cell stack surplus generated electric power from the converter control unit 220, it checks whether the fuel cell stack surplus generated electric power is lower than "0 (zero)." If the fuel cell stack surplus generated electric power is lower than "0," the warming-up restriction unit 230 sets the target supply electric power to the cathode compressor 24 to a predetermined limit value smaller than an upper limit value of a variable range to prevent over-discharge of the battery 55.

Note that the limit value of the electric power supplied to the cathode compressor 24 is set to, for example, an electric power value that enables a supply of cathode gas to the fuel cell stack 1 at the minimum flow rate necessary for the fuel cell stack 1 to generate electric power.

If the fuel cell stack surplus generated electric power is negative, that is to say, if there is a shortage in the electric power generated by the fuel cell stack 1, the warming-up restriction unit 230 restricts the target supply electric power to the cooling water heater 46 to "0" when the discharge electric power from the battery 55 is not enough to supplement the amount of shortage in the generated electric power. This can suppress over-discharge of the battery 55 associated with a supply of electric power to the cooling water heater 46 during the warming-up facilitation operation.

Alternatively, if the fuel cell stack surplus generated electric power is negative, that is to say, if there is a shortage in the electric power generated by the fuel cell stack 1, the warming-up restriction unit 230 may reduce the electric power supplied to the cooling water heater 46 so as not to exceed the electric power suppliable from the fuel cell stack 1 and the battery 55. In this way, the fuel cell stack 1 can be heated with the cooling water heater 46 for a longer period compared to the case where the electric power supplied to the cooling water heater 46 is restricted to "0" in the event of a shortage in the electric power generated by the fuel cell stack 1.

A description is now given of a method of restricting warming-up of the fuel cell stack 1.

Figure 3:
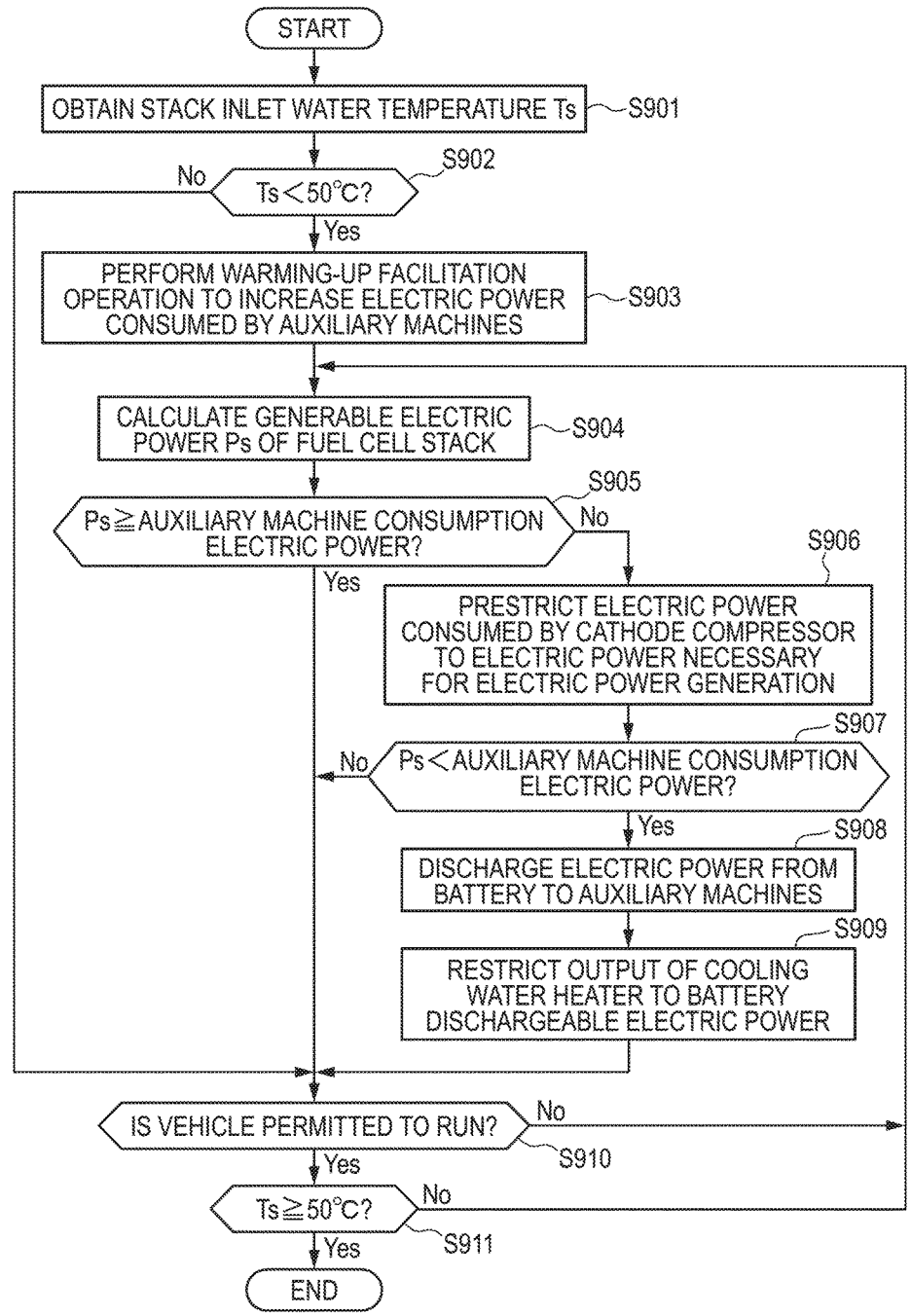
FIG. 3 is a flowchart showing a method of restricting warming-up of fuel cells.

FIG. 3 is a flowchart showing an example of a warming-up restriction method implemented by the controller 6.

First, upon receiving a start request from the key sensor 63, the controller 6 activates the fuel cell system 100.

When the fuel cell system 100 has been activated, the controller 6 obtains a stack inlet water temperature Ts from the second water temperature sensor 48 in step S901.

In step S902, the warming-up operation unit 210 of the controller 6 determines whether the stack inlet water temperature Ts is lower than the predetermined warming-up threshold (50° C.).

If the warming-up operation unit 210 of the controller 6 determines that the stack inlet water temperature Ts is lower than 50° C., it performs the warming-up facilitation operation of the fuel cell system 100 in step S903. In the warming-up facilitation operation, the warming-up operation unit 210 increases, among the electric powers supplied to the auxiliary machines 57, the electric power supplied to each of the cathode compressor 24 and the cooling water heater 46 to an upper limit value of a variable range.

In step S904, for example, the converter control unit 220 of the controller 6 obtains detected values from the stack current sensor 51 and stack voltage sensor 52, estimates the output characteristic of the fuel cell stack 1, and calculates a generable electric power Ps of the fuel cells 1 from the result of estimation of the output characteristic. The generable electric power Ps is not limited to being calculated using the foregoing method, and may be calculated using the temperature of the fuel cells.

In step S905, the converter control unit 220 of the controller 6 determines whether the generable electric power Ps of the fuel cell stack 1 is equal to or higher than the auxiliary machine consumption electric power consumed by the auxiliary machines 57 and the DC-to-DC converter 56. That is to say, the converter control unit 220 determines whether the DC-to-DC converter 56 is to cause discharge of electric power from the battery 55 to the auxiliary machines 57.

If the generable electric power Ps of the fuel cell stack 1 is lower than the auxiliary machine consumption electric power, the converter control unit 220 of the controller 6 determines that the DC-to-DC converter 56 is to cause discharge of electric power from the battery 55 to the auxiliary machines 57 in step S906.

Once the converter control unit 220 has determined that electric power is to be discharged from the battery 55 to the auxiliary machines 57, it restricts the electric power supplied to the cathode compressor 24 to the minimum requirement of electric power necessary for the fuel cell stack 1 to generate electric power. Note that the electric power supplied to the compressor 24 may be adjusted in accordance with the generable electric power Ps of the fuel cell stack 1.

In step S907, the converter control unit 220 of the controller 6 determines whether the generable electric power Ps of the fuel cell stack 1 is lower than the auxiliary machine consumption electric power after restricting the electric power supplied to the cathode compressor 24.

If the generable electric power Ps of the fuel cell stack 1 is lower than the auxiliary machine consumption electric power after restricting the electric power supplied to the cathode compressor 24, the converter control unit 220 of the controller 6 supplies electric power from the battery 55 to the auxiliary machines 57 in step S908. For example, the converter control unit 220 adjusts the voltage of the DC-to-DC converter 56 at the battery 55 side to a voltage value that enables a supply of current from the battery 55 to the auxiliary machines 57.

If the converter control unit 220 determines that electric power is to be supplied from the battery 55 to the auxiliary machines 57, the warming-up restriction unit 230 of the controller 6 restricts the electric power supplied to the cooling water heater 46 in step S909.

For example, the warming-up restriction unit 230 determines whether the difference obtained by subtracting the generable electric power Ps of the fuel cell stack 1 from the auxiliary machine consumption electric power after the restriction is higher than an upper limit value of the battery dischargeable electric power. If the difference obtained by subtracting the generable electric power Ps from the auxiliary machine consumption electric power is higher than the upper limit value of the battery dischargeable electric power, the warming-up restriction unit 230 restricts the electric power supplied to the cooling water heater 46 to low power, i.e., the battery dischargeable electric power.

In step S910, the controller 6 checks whether the vehicle has been permitted to run. Specifically, the controller 6 checks whether the vehicle has been permitted to run if the stack inlet water temperature Ts is equal to or higher than 50° C. in step S902, or if the generable electric power Ps of the fuel cell stack 1 is equal to or higher than the auxiliary machine consumption electric power in steps S905 and S907.

For example, the controller 6 changes the output current of the fuel cell stack 1 during the warming-up facilitation operation, and estimates the I-V characteristic of the fuel cell stack 1 on the basis of detected values obtained from the stack current sensor 51 and the stack voltage sensor 52 while changing the output current. The controller 6 permits the vehicle to run if the estimated characteristic is determined to exceed a predetermined I-V characteristic. Note that the predetermined I-V characteristic denotes an I-V characteristic that enables a supply of the minimum electric power necessary for the driving motor to drive the vehicle.

If the vehicle is not permitted to run, the controller 6 returns to step S904. If the vehicle is permitted to run, the controller 6 proceeds to step S911.

In step S911, the controller 6 repeats the sequence of processes from step S904 to step S910 until the stack inlet water temperature Ts reaches or exceeds 50° C., and ends the warming-up restriction method when the stack inlet water temperature Ts reaches or exceeds 50° C.

In the first embodiment of the present invention, when warming up the fuel cell stack 1, the warming-up operation unit 210 first increases the electric power supplied to the auxiliary machines 57, including the cooling water heater 46, the cathode compressor 24, and the like, to the predetermined electric power necessary for warming-up.

Accordingly, the fuel cell stack 1 is heated by cooling water that has been heated by the cooling water heater 46. The fuel cell stack 1 is also warmed up by its self-heat generation attributed to driving of the auxiliary machines 57.

During warming-up, cooling water that circulates inside the fuel cell stack 1 is heated by the cooling water heater 46, and also by self-heat generation of the fuel cell stack 1. Cooling water thus heated circulates inside the fuel cell stack 1. Accordingly, cooling water provides heat to the fuel cell stack 1 repeatedly.

Therefore, heating the fuel cell stack 1 with the cooling water heater 46 has a greater effect of increasing the temperature of the fuel cell stack 1 than increasing the amount of self-heat generation by the fuel cell stack 1 by increasing the generated electric power supplied to the cathode compressor 24 beyond necessity.

In such a situation, if there is a shortage in the electric power supplied to the auxiliary machines 57 due to a poor I-V characteristic of the fuel cell stack 1, electric power corresponding to the shortage is supplied from the battery 55 to the auxiliary machines 57. In this case, the warming-up restriction unit 230 reduces the electric power supplied to the cathode compressor 24 before reducing the electric power supplied to the cooling water heater 46.

As such, the electric power supplied to the cathode compressor 24 is restricted first because the effect of increasing the temperature of the fuel cell stack 1 with the cathode compressor 24 is small. Thus, electric power discharged from the battery 55 to the auxiliary machines 57 can be efficiently reduced, and the occurrence of over-discharge of the battery 55 can be suppressed.

Furthermore, warming-up of the fuel cell stack 1 can be completed promptly compared to a case where the electric power supplied to the cooling water heater 46 is restricted before restricting the electric power supplied to the cathode compressor 24.

Accordingly, the fuel cell stack 1 can be promptly warmed up while suppressing the occurrence of over-discharge of the battery 55.

Second Embodiment

A more detailed configuration of the controller 6 will be described in a second embodiment of the present invention with reference to FIGS. 4 to 9. Note that a fuel cell system according to the present embodiment is basically configured in the same manner as the fuel cell system 100 shown in FIG. 1. Thus, the same components are given the same reference signs, and a detailed description thereof is omitted below.

In the present embodiment, the controller 6 includes a cathode gas flow rate control unit 201, a cathode gas pressure control unit 202, a heater output control unit 203, a heater suppliable electric power computation unit 237, and an over-discharge prevention flag generation unit 500.

Figure 4:
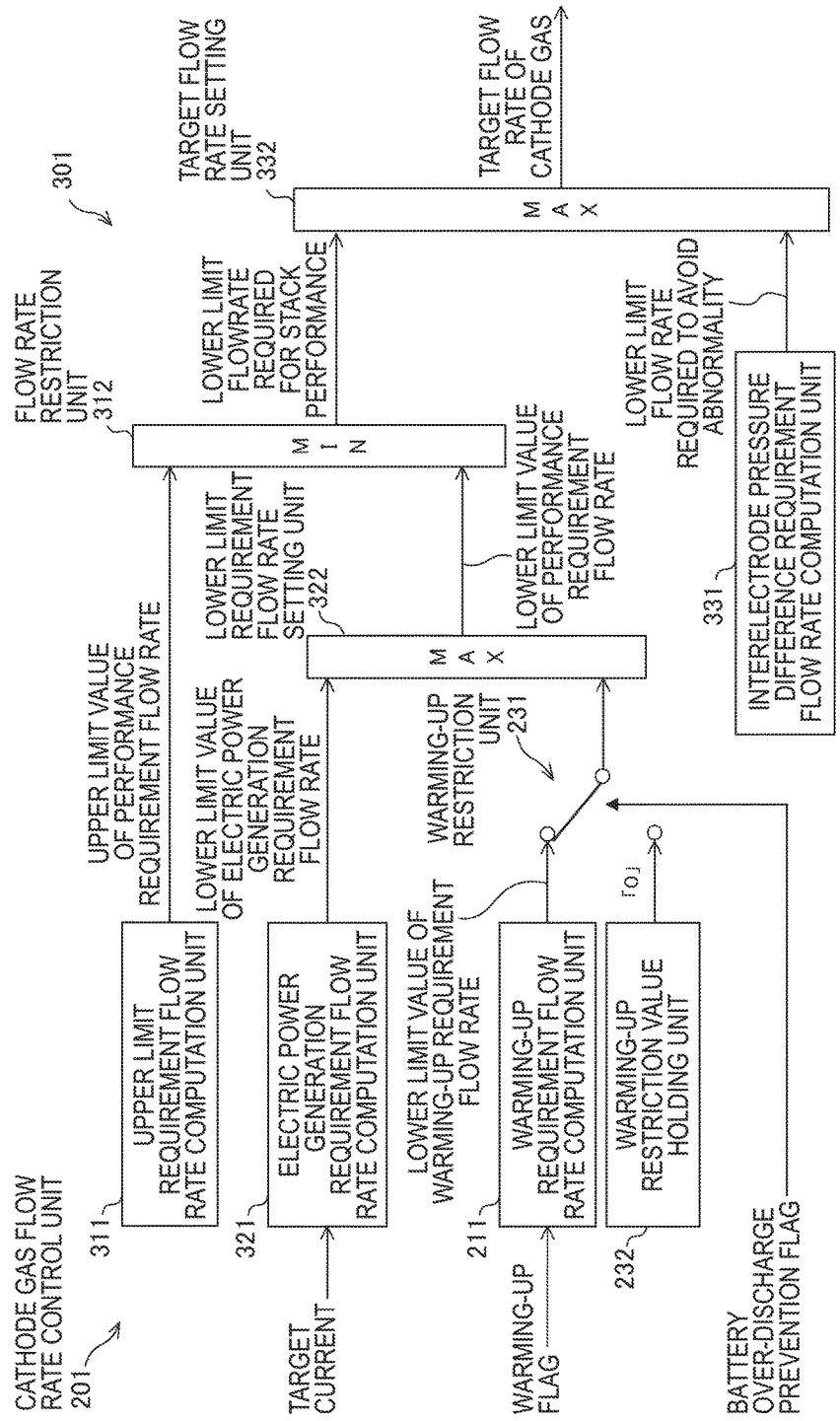
FIG. 4 is a block diagram showing a configuration of a cathode gas flow rate control unit according to a second embodiment.

FIG. 4 is a block diagram showing a detailed configuration of the cathode gas flow rate control unit 201 comprising the controller 6.

The cathode gas flow rate control unit 201 controls the flow rate of cathode gas supplied to the fuel cell stack 1.

The cathode gas flow rate control unit 201 includes a warming-up requirement flow rate computation unit 211, a warming-up restriction unit 231, a warming-up restriction value holding unit 232, and a normal control unit 301.

The normal control unit 301 includes an upper limit requirement flow rate computation unit 311, a flow rate restriction unit 312, an electric power generation requirement flow rate computation unit 321, a lower limit requirement flow rate setting unit 322, an interelectrode pressure difference requirement flow rate computation unit 331, and a target flow rate setting unit 332.

The upper limit requirement flow rate computation unit 311 computes an upper limit value of the cathode gas flow rate to prevent a decline in the performance of the fuel cell stack 1.

For example, the performance of the electrolyte membranes related to electric power generation declines when the fuel cell stack 1 is in an overdry state. To address this issue, the upper limit requirement flow rate computation unit 311 calculates the upper limit value of the cathode gas flow rate to restrict the amount of water vapor that is carried outside by cathode gas flowing in the fuel cell stack 1.

Whether or not the fuel cell stack 1 is dry can be estimated by measuring the internal resistance of the fuel cell stack 1. For example, the fuel cell stack 1 is estimated to be in a dry state when the measured internal resistance of the fuel cell stack 1 has a larger value.

The internal resistance of the fuel cell stack 1 is measured as follows. The DC-to-DC converter 56 outputs an alternating-current signal of a predetermined frequency to the fuel cell stack 1, and the internal resistance (HFR) of the fuel cell stack 1 is measured by using the output voltage and the output current of the fuel cell stack 1. Alternatively, an apparatus that measures the internal resistance of the fuel cell stack 1 may be separately provided to the fuel cell system 100.

The upper limit requirement flow rate computation unit 311 stores, for example, a moisture requirement flow rate map that has been generated to prevent over-drying of the fuel cell stack 1. The moisture requirement flow rate map shows one-to-one correspondence between internal resistance values of the fuel cell stack 1 and requirement flow rates of cathode gas that have been set to restrict the amount of water vapor carried from the fuel cell stack 1. Note that the moisture requirement flow rate map is set beforehand on the basis of, for example, data of experiments and the like.

Upon obtaining a measured value of the internal resistance of the fuel cell stack 1, the upper limit requirement flow rate computation unit 311 refers to the moisture requirement map and calculates a requirement flow rate corresponding to the measured value. That is to say, on the basis of the internal resistance of the fuel cell stack 1, the upper limit requirement flow rate computation unit 311 calculates an upper limit value of a performance requirement flow rate that has been set to prevent a performance decline associated with over-drying of the fuel cell stack 1.

For example, the larger the measured value of the internal resistance of the fuel cell stack 1, the smaller the value of the performance requirement flow rate set by the upper limit requirement flow rate computation unit 311. The upper limit requirement flow rate computation unit 311 outputs the performance requirement flow rate thus set to the flow rate restriction unit 312.

The electric power generation requirement flow rate computation unit 321 computes a lower limit value of a requirement flow rate of cathode gas on the basis of a target value of current extracted from the fuel cell stack 1 (hereinafter referred to as "target current").

The target flow rate is calculated on the basis of the electric power required by the loads, such as the auxiliary machines 57 and the driving motor 53. For example, after the vehicle is permitted to run, the larger the depression amount of the accelerator pedal, the larger the value of the requirement electric power set by the controller 6. The controller 6 identifies a current value that satisfies the requirement electric power with reference to a reference characteristic of the fuel cell stack 1, and sets the identified current value as the target current.

Specifically, an electric power generation requirement map for the fuel cell stack 1 is recorded in the electric power generation requirement flow rate computation unit 321. The electric power generation requirement map shows one-to-one correspondence between current values of the fuel cell stack 1 and the minimum supply flow rates of cathode gas necessary for extracting the current values. Note that the electric power generation requirement map is set beforehand on the basis of, for example, data of experiments and the like.

Upon obtaining a target current of the fuel cell stack 1, the electric power generation requirement flow rate computation unit 321 refers to the electric power generation requirement map and calculates a requirement flow rate corresponding to the target current. The higher the target current of the fuel cell stack 1, the smaller the value of the electric power generation requirement flow rate set by the electric power generation requirement flow rate computation unit 321. The electric power generation requirement flow rate computation unit 321 outputs the electric power generation requirement flow rate thus set to the lower limit requirement flow rate setting unit 322.

On the basis of a set value of a warming-up flag, the warming-up requirement flow rate computation unit 211 computes a lower limit value of a requirement flow rate of cathode gas necessary for warming up the fuel cell stack 1.

The warming-up operation unit 210 sets the warming-up flag to "1" when the stack inlet water temperature is lower than the predetermined warming-up threshold (e.g., 50° C.), and to "0" when the stack inlet water temperature is equal to or higher than the warming-up threshold.

When the set value of the warming-up flag indicates "0," the warming-up requirement flow rate computation unit 211 sets a warming-up requirement flow rate to "0." On the other hand, when the set value of the warming-up flag indicates "1," the warming-up requirement flow rate computation unit 211 sets the warming-up requirement flow rate to a predetermined value so that the electric power supplied to the cathode compressor 24 has the maximum value. Note that the higher the rotational speed of the cathode compressor 24, the more electric power is supplied to the cathode compressor 24.

That is to say, during the warming-up facilitation operation, the warming-up requirement flow rate computation unit 211 outputs an upper limit value of a variable range for the cathode compressor 24 to the warming-up restriction unit 231 as the warming-up requirement flow rate.

The warming-up restriction value holding unit 232 holds a warming-up restriction value that has been set to restrict the warming-up facilitation operation. In the present embodiment, the warming-up restriction value is "0" and output to the warming-up restriction unit 231.

On the basis of a set value of a battery over-discharge prevention flag, the warming-up restriction unit 231 switches the lower limit value of the warming-up requirement flow rate to the warming-up restriction value (0).

The warming-up restriction unit 230 shown in FIG. 2 sets the battery over-discharge prevention flag. The battery over-discharge prevention flag is set to "1" when the discharge electric power supplied from the battery 55 to the auxiliary machines 57 is higher than zero. The battery over-discharge prevention flag is set to "0" when the discharge electric power is lower than zero, that is to say, when electric power is not discharged from the battery 55. Note that a method of generating the battery over-discharge prevention flag will be described later with reference to FIG. 5.

When the set value of the battery over-discharge prevention flag indicates "0," the warming-up restriction unit 231 determines that electric power is not discharged from the battery 55 to the auxiliary machines 57, and outputs the warming-up requirement flow rate to the lower limit requirement flow rate setting unit 322.

On the other hand, when the set value of the battery over-discharge prevention flag indicates "1," the warming-up restriction unit 231 determines that electric power is discharged from the battery 55 to the auxiliary machines 57, and outputs the warming-up restriction value (0) to the lower limit requirement flow rate setting unit 322. Consequently, the rotational speed of the cathode compressor 24 is suppressed, and hence the electric power supplied from the battery 55 to the cathode compressor 24 can be reduced.

The lower limit requirement flow rate setting unit 322 selects a larger one of the lower limit value of the electric power generation requirement flow rate and the output value from the warming-up restriction unit 231, and outputs the selected value to the flow rate restriction unit 312 as a lower limit value of the performance requirement flow rate.

For example, when the battery over-discharge flag is set to "1," the warming-up restriction unit 231 outputs the warming-up restriction value (0), and the lower limit requirement flow rate setting unit 322 outputs the lower limit value of the electric power generation requirement flow rate to the flow rate restriction unit 312 as the lower limit value of the performance requirement flow rate. In this way, when current is discharged from the battery 55 to the auxiliary machines 57 during the warming-up facilitation operation, the performance requirement flow rate of cathode gas is restricted to the minimum supply flow rate necessary for the fuel cell stack 1 to generate electric power.

The flow rate restriction unit 312 selects a smaller one of the upper limit value of the performance requirement flow rate from the upper limit requirement flow rate computation unit 311 and the lower limit value of the performance requirement flow rate from the lower limit requirement flow rate setting unit 322, and outputs the selected value to the target flow rate setting unit 332 as a lower limit flow rate required for the stack performance.

For example, when the state of electric power generation by the fuel cell stack 1 is favorable, the upper limit value of the performance requirement flow rate is larger than the lower limit value of the performance requirement flow rate, and thus the flow rate restriction unit 312 outputs the lower limit value of the performance requirement flow rate as the lower limit flow rate required for the stack performance.

On the other hand, if the upper limit value of the performance requirement flow rate decreases and falls below the lower limit value of the performance requirement flow rate due to a dry state of the fuel cell stack 1, the lower limit flow rate required for the stack performance is restricted to the upper limit value of the performance requirement flow rate and then output to the target flow rate setting unit 332.

The interelectrode pressure difference requirement flow rate computation unit 331 computes a lower limit value of the cathode gas flow rate in order to prevent damage of the electrolyte membranes caused by an increase in a so-called interelectrode pressure difference, which is the pressure difference between the cathode gas pressure and the anode gas pressure inside the fuel cell stack 1.

For example, the interelectrode pressure difference requirement flow rate computation unit 331 stores a pressure difference control map. The pressure difference control map shows one-to-one correspondence between the pressures of anode gas supplied to the fuel cell stack 1 and the requirement flow rates of cathode gas that are set in accordance with an allowable pressure difference in the electrolyte membranes. Note that the pressure difference control map is set beforehand on the basis of, for example, data of experiments and the like.

Upon obtaining a detected value of the anode gas pressure from the anode pressure sensor 34, the interelectrode pressure difference requirement flow rate computation unit 331 calculates a requirement flow rate corresponding to the detected value with reference to the pressure difference control map, and outputs the calculated value to the target flow rate setting unit 332 as a lower limit flow rate required to avoid abnormality.

The target flow rate setting unit 332 selects a larger one of the value of the lower limit flow rate required for the stack performance and the value of the lower limit flow rate required to avoid abnormality, and calculates the selected value as the target flow rate of cathode gas.

For example, when the state of electric power generation by the fuel cell stack 1 is favorable, the lower limit flow rate required to avoid abnormality falls below the lower limit flow rate required for the stack performance, and thus the target flow rate setting unit 332 sets the lower limit flow rate required for the stack performance as the target flow rate of cathode gas.

On the other hand, when the interelectrode pressure difference of the fuel cell stack 1 exceeds the allowable pressure difference, the lower limit flow rate required to avoid abnormality exceeds the lower limit flow rate required for the stack performance. In this case, the target flow rate setting unit 332 sets the lower limit flow rate required to avoid abnormality as the target flow rate of cathode gas.

Figure 5:
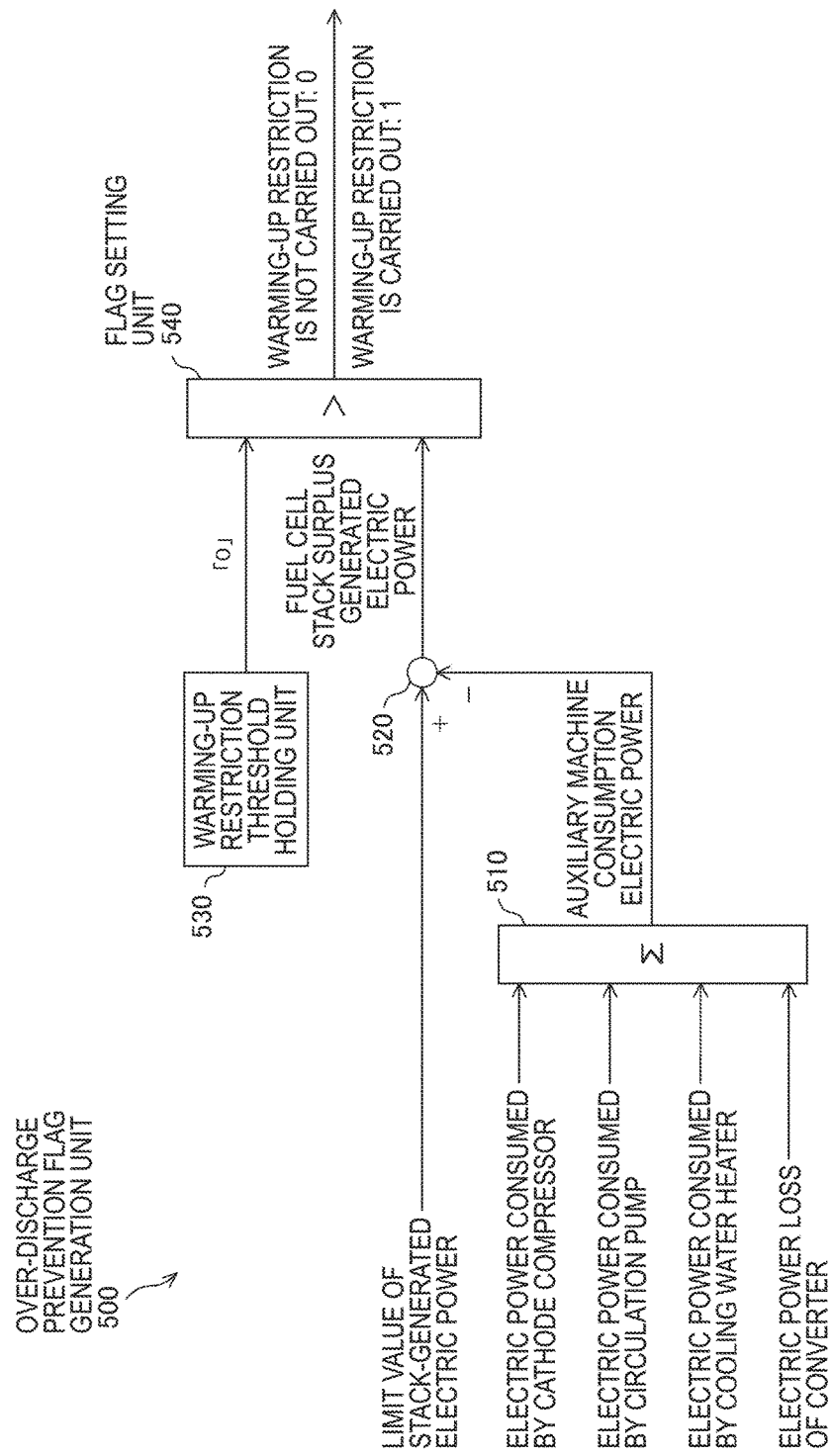
FIG. 5 is a block diagram showing a configuration of an over-discharge prevention flag generation unit.

FIG. 5 is a block diagram showing a configuration of the over-discharge prevention flag generation unit 500.

The over-discharge prevention flag generation unit 500 generates the battery over-discharge flag in accordance with a discharge state of the battery 55. Note that the over-discharge prevention flag generation unit 500 is included in the warming-up restriction unit 230.

The over-discharge prevention flag generation unit 500 includes an auxiliary machine consumption electric power calculation unit 510, a discharge electric power calculation unit 520, a warming-up restriction threshold holding unit 530, and a flag setting unit 540.

The auxiliary machine consumption electric power calculation unit 510 obtains a sum total of the electric power consumed by the cathode compressor 24, the electric power consumed by the circulation pump 45, the electric power consumed by the cooling water heater 46, and the electric power loss of the DC-to-DC converter 56.

The electric power consumed by the cathode compressor 24 is calculated on the basis of a detected value of the rotational speed of the cathode compressor 24 and an estimated value of torque thereof. The electric power consumed by the cathode compressor 24 is set to an upper limit value of a set range during the warming-up facilitation operation.

The electric power consumed by the circulation pump 45 is an actual value of the electric power consumed by the circulation pump 45. For example, a current sensor that detects a value of current supplied from the battery 55 to the circulation pump 45, as well as a voltage sensor that detects a voltage value of the circulation pump 45, is connected to the circulation pump 45. A product of the value detected by the current sensor and the value detected by the voltage sensor serves as a value of the electric power consumed by the circulation pump 45.

The electric power consumed by the cooling water heater 46 is set to an upper limit value of a set range during the warming-up facilitation operation.

The electric power loss of the DC-to-DC converter 56 is an actual value of the electric power loss that occurs in the DC-to-DC converter 56. For example, it is calculated on the basis of a product of values detected by a current sensor and a voltage sensor that are provided inside the DC-to-DC converter 56 at the fuel cell stack 1 side, and a product of values detected by a current sensor and a voltage sensor that are provided inside the DC-to-DC converter 56 at the battery 55 side.

The auxiliary machine consumption electric power calculation unit 510 obtains a sum total of the electric power consumed by the cathode compressor 24, the electric power consumed by the circulation pump 45, the electric power consumed by the cooling water heater 46, and the electric power loss of the DC-to-DC converter 56, and outputs the sum total to the discharge electric power calculation unit 520 as the auxiliary machine consumption electric power.

The discharge electric power calculation unit 520 outputs a value obtained by subtracting the auxiliary machine consumption electric power from a limit value of a stack-generated electric power to the flag setting unit 540.

The limit value of the stack-generated electric power has been set to prevent an extreme reduction in the output voltage of the fuel cell stack 1. The limit value of the stack-generated electric power is calculated on the basis of the voltage of the fuel cell stack 1. For example, the limit value of the stack-generated electric power is calculated from a restriction map generated on the basis of data of experiments and the like.

The warming-up restriction threshold holding unit 530 holds a warming-up restriction threshold that has been set to restrict the warming-up facilitation operation. In the present embodiment, the warming-up restriction threshold is "0" and output to the flag setting unit 540.

The flag setting unit 540 sets the battery over-discharge flag to "0" when the fuel cell stack surplus generated electric power is equal to or lower than the warming-up restriction threshold. On the other hand, the flag setting unit 540 sets the battery over-discharge flag to "1" to carry out warming-up restriction when the fuel cell stack surplus generated electric power is higher than the warming-up restriction threshold. Once the flag setting unit 540 has set the battery over-discharge flag to "1" during the warming-up facilitation operation, it keeps the battery over-discharge flag fixed to "1" until the warming-up facilitation operation is ended. This is because, if warming-up restriction is carried out frequently during the warming-up facilitation operation, the fuel cell stack 1 becomes unstable.

As such, the over-discharge prevention flag generation unit 500 sets the battery over-discharge flag to "1" when the electric power supplied from the battery 55 to the auxiliary machines 57 exceeds zero. Consequently, the target flow rate of cathode gas is restricted during the warming-up facilitation operation as described with reference to FIG. 4, and thus the electric power supplied to the cathode compressor 24 can be restricted.

Note that during the warming-up facilitation operation, the electric power supplied to the cathode compressor 24 is increased not only by increasing the flow rate of cathode gas supplied to the fuel cell stack 1, but also by increasing the cathode gas pressure using the cathode pressure regulator valve 29. That is to say, in order to increase the electric power supplied to the cathode compressor 24, the rotational speed and torque of the cathode compressor 24 are increased.

Therefore, when restricting the warming-up facilitation operation, the electric power supplied to the cathode compressor 24 can be reduced also by reducing the cathode gas pressure. In view of this, the following describes an example in which the electric power supplied to the cathode compressor 24 is restricted by causing the cathode gas pressure to fall below a warming-up requirement pressure.

Figure 6:
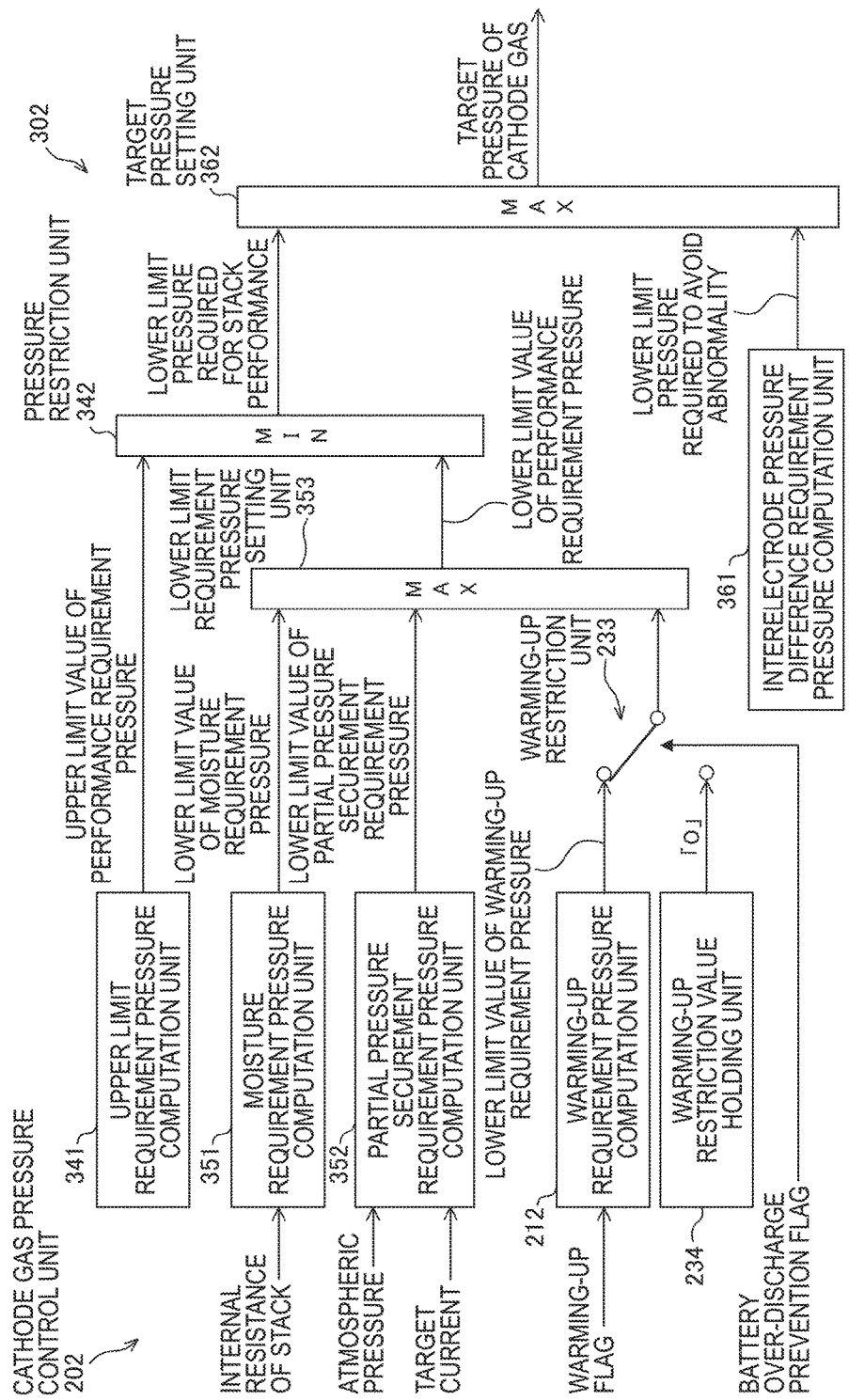
FIG. 6 is a block diagram showing a configuration of a cathode gas pressure control unit.

FIG. 6 is a block diagram showing a detailed configuration of the cathode gas pressure control unit 202.

The cathode gas pressure control unit 202 controls the pressure of cathode gas supplied to the fuel cell stack 1.

The cathode gas pressure control unit 202 includes a warming-up requirement pressure computation unit 212, a warming-up restriction unit 233, a warming-up restriction value holding unit 234, and a normal control unit 302.

The normal control unit 302 includes an upper limit requirement pressure computation unit 341, a pressure restriction unit 342, a moisture requirement pressure computation unit 351, a partial pressure securement requirement pressure computation unit 352, a lower limit requirement pressure setting unit 353, an interelectrode pressure difference requirement pressure computation unit 361, and a target pressure setting unit 362.

The upper limit requirement pressure computation unit 341 computes an upper limit value of a requirement pressure of cathode gas supplied to the fuel cell stack 1.

For example, if the current that is supplied to the cathode compressor 24 by passing through the DC/DC converter 56 increases excessively, the electric power loss of the DC/DC converter 56 increases excessively, and the efficiency of electric power generation by the fuel cell system 100 declines. To address this issue, the upper limit requirement pressure computation unit 341 calculates an upper limit value of the cathode gas pressure on the basis of, for example, the rotational speed and torque of the cathode compressor 24 so as to prevent a decline in the performance of the fuel cell system 100. The upper limit requirement pressure computation unit 341 outputs the result of the calculation to the pressure restriction unit 342 as an upper limit value of a performance requirement pressure.

In order to maintain the fuel cell stack 1 in a favorable wet state, the moisture requirement pressure computation unit 351 computes a lower limit value of the cathode gas pressure on the basis of a measured value of the internal resistance of the fuel cell stack 1.

Specifically, the moisture requirement pressure computation unit 351 stores a moisture requirement pressure map that has been generated to prevent over-drying of the fuel cell stack 1. The moisture requirement pressure map shows one-to-one correspondence between internal resistance values and requirement pressures of cathode gas, in such a manner that the larger the internal resistance value of the fuel cell stack 1, the lower the partial pressure of water vapor inside the fuel cell stack 1. Note that the moisture requirement pressure map is set beforehand on the basis of, for example, data of experiments and the like.

Upon obtaining a measured value of the internal resistance of the fuel cell stack 1, the moisture requirement pressure computation unit 351 refers to the moisture requirement pressure map, and calculates a requirement pressure corresponding to the measured value. For example, the dryer the fuel cell stack 1 and the higher the internal resistance of the fuel cell stack 1, the larger the value of the requirement pressure output from the moisture requirement pressure computation unit 351 to the pressure restriction unit 342. This allows changing the fuel cell stack 1 from a dry state toward a wet state.

In order to secure the minimum partial pressure of cathode gas necessary for the fuel cell stack 1 to generate electric power, the partial pressure securement requirement pressure computation unit 352 computes a lower limit value of the requirement pressure of cathode gas on the basis of a value detected by the atmospheric pressure sensor 61 and the target current of the fuel cell stack 1.

With an increase in the temperature of the fuel cell stack 1, liquid water turns into water vapor, the amount of water vapor increases, and the partial pressure of water vapor increases in the fuel cell stack 1. As a result, the partial pressure of cathode gas becomes relatively low, and the concentration of oxygen in electric power generation regions of the fuel cells decreases. To address this issue, the cathode gas pressure is increased in accordance with an increase in the partial pressure of water vapor.

Specifically, the partial pressure securement requirement pressure computation unit 352 stores partial pressure requirement maps that have been generated to maintain the partial pressure of cathode gas inside the fuel cell stack 1 at a partial pressure necessary for electric power generation. The partial pressure requirement maps are in one-to-one correspondence with atmospheric pressures. Each partial pressure requirement map shows correspondence between the target current of the fuel cell stack 1 and the requirement pressure of cathode gas that is set in accordance with the target current. Note that the partial pressure requirement maps are set beforehand on the basis of, for example, data of experiments and the like.

Upon obtaining a set value of the target current and a detected value of the atmospheric pressure, the partial pressure securement requirement pressure computation unit 352 refers to a partial pressure requirement map corresponding to the detected value of the atmospheric pressure, and outputs a requirement pressure corresponding to the set value of the target current to the pressure restriction unit 342 as a lower limit value of a partial pressure securement requirement pressure.

For example, the higher the target current of the fuel cell stack 1, the higher the partial pressure securement requirement pressure set by the partial pressure securement requirement pressure computation unit 352. Furthermore, the higher the atmospheric pressure, the higher the partial pressure securement requirement pressure set by the partial pressure securement requirement pressure computation unit 352.

On the basis of the set value of the warming-up flag set by the warming-up operation unit 210 shown in FIG. 2, the warming-up requirement pressure computation unit 212 computes a lower limit value of the requirement pressure of cathode gas necessary for warming up the fuel cell stack 1.

When the set value of the warming-up flag indicates "0," the warming-up requirement pressure computation unit 212 sets the warming-up requirement pressure to "0." On the other hand, when the set value of the warming-up flag indicates "1," the warming-up requirement pressure computation unit 212 sets the warming-up requirement pressure to a predetermined value so as to maximize the electric power supplied to the cathode compressor 24. That is to say, during the warming-up facilitation operation, the warming-up requirement pressure computation unit 212 outputs an upper limit value of the electric power supplied to the cathode compressor 24 to the warming-up restriction unit 233 as the warming-up requirement pressure.

The warming-up restriction value holding unit 234 holds a warming-up restriction value that has been set to restrict the warming-up facilitation operation. In the present embodiment, the warming-up restriction value is "0" and output to the warming-up restriction unit 233.

On the basis of the set value of the battery over-discharge prevention flag described with reference to FIG. 5, the warming-up restriction unit 233 switches the lower limit value of the warming-up requirement pressure to "0."

When the set value of the battery over-discharge prevention flag indicates "0," the warming-up restriction unit 233 determines that electric power is not discharged from the battery 55 to the auxiliary machines 57, and outputs the lower limit value of the warming-up requirement pressure to the lower limit requirement pressure setting unit 353.

On the other hand, when the set value of the battery over-discharge prevention flag indicates "1," the warming-up restriction unit 233 determines that electric power is discharged from the battery 55 to the auxiliary machines 57, and outputs the warming-up restriction value (0) to the lower limit requirement pressure setting unit 353. Consequently, torque of the cathode compressor 24 is suppressed, and hence the electric power supplied from the battery 55 to the cathode compressor 24 can be reduced.

The lower limit requirement pressure setting unit 353 selects a larger one of a lower limit value of a moisture requirement pressure and the value output from the warming-up restriction unit 233, and outputs the selected value to the pressure restriction unit 342 as a lower limit value of the performance requirement pressure.

For example, when the battery over-discharge flag is set to "1" and the warming-up restriction unit 233 outputs the warming-up restriction value (0), the lower limit requirement pressure setting unit 353 outputs the lower limit value of the moisture requirement pressure to the pressure restriction unit 342 as the lower limit value of the performance requirement pressure. That is to say, when current is discharged from the battery 55 to the auxiliary machines 57, the lower limit requirement pressure setting unit 353 switches the lower limit value of the performance requirement pressure of cathode gas from the warming-up requirement pressure to the moisture requirement pressure.

The pressure restriction unit 342 selects a smaller one of the upper limit value of the performance requirement pressure from the upper limit requirement pressure computation unit 341 and the lower limit value of the performance requirement pressure from the lower limit requirement pressure setting unit 353, and outputs the selected value to the target pressure setting unit 362 as a lower limit pressure required for the stack performance.

For example, when the state of electric power generation by the fuel cell stack 1 is favorable, the upper limit value of the performance requirement pressure is larger than the lower limit value of the performance requirement pressure, and thus the pressure restriction unit 342 outputs the lower limit value of the performance requirement pressure as the lower limit pressure required for the stack performance.

On the other hand, if the upper limit value of the performance requirement pressure decreases and falls below the lower limit value of the performance requirement pressure due to a decline in the performance of electric power generation by the fuel cell stack 1, the lower limit pressure required for the stack performance is restricted to the upper limit value of the performance requirement pressure and then output to the target pressure setting unit 362.

The interelectrode pressure difference requirement pressure computation unit 361 computes a lower limit value of the cathode gas pressure so as to suppress deterioration in the durability of the electrolyte membranes caused by an increase in the interelectrode pressure difference.

For example, the interelectrode pressure difference requirement pressure computation unit 361 stores a pressure difference restriction map. The pressure difference restriction map shows one-to-one correspondence between the pressures of anode gas supplied to the fuel cell stack 1 and the requirement pressures of cathode gas that are set in accordance with the allowable pressure difference in the electrolyte membranes. Note that the pressure difference restriction map is set beforehand on the basis of for example, data of experiments and the like.

Upon obtaining a detected value of the anode gas pressure from the anode pressure sensor 34, the interelectrode pressure difference requirement pressure computation unit 361 calculates a requirement pressure corresponding to the detected value with reference to the pressure difference restriction map, and outputs the calculated value to the target pressure setting unit 362 as a lower limit pressure required to avoid abnormality.

The target pressure setting unit 362 selects a larger one of the value of the lower limit pressure required for the stack performance and the value of the lower limit pressure required to avoid abnormality, and calculates the selected value as the target pressure of cathode gas.

For example, when the state of electric power generation by the fuel cell stack 1 is favorable, the lower limit pressure required to avoid abnormality falls below the lower limit pressure required for the stack performance, and thus the target pressure setting unit 362 sets the lower limit pressure required for the stack performance as the target pressure of cathode gas.

On the other hand, if the lower limit pressure required to avoid abnormality exceeds the lower limit pressure required for the stack performance as a result of the interelectrode pressure difference in the fuel cell stack 1 exceeding the allowable pressure difference, the target pressure setting unit 362 sets the lower limit pressure required to avoid abnormality as the target pressure of cathode gas.

As described above, when electric power is discharged from the battery 55 to the auxiliary machines 57 during the warming-up facilitation operation, the target pressure of cathode gas is reduced by switching the warming-up requirement pressure to 0. Consequently, the electric power supplied to the cathode compressor 24 can be reduced.

Note that the electric power supplied to the cooling water heater 46 is restricted if there is a risk of over-discharge of the battery 55 due to continuous discharge of electric power from the battery 55 to the auxiliary machines 57 after the electric power supplied to the cathode compressor 24 is restricted during the warming-up facilitation operation. In view of this, the following describes a method of restricting the electric power supplied to the cooling water heater 46 during the warming-up facilitation operation.

Figure 7:
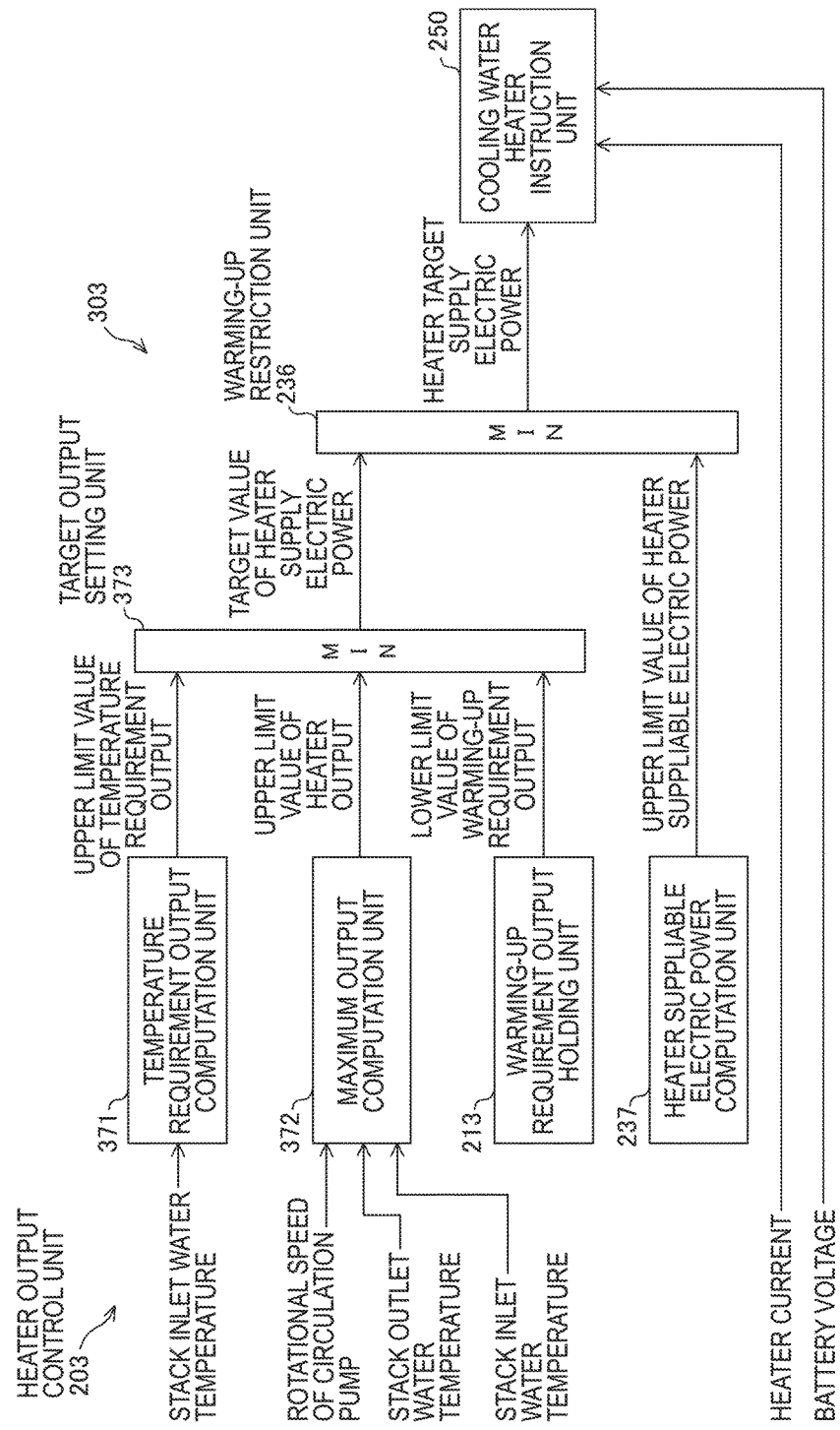
FIG. 7 is a block diagram showing a configuration of a heater output control unit.

FIG. 7 is a block diagram showing a detailed configuration of the heater output control unit 203.

The heater output control unit 203 restricts the output of the cooling water heater 46 after the electric power supplied to the cathode compressor 24 is restricted during the warming-up facilitation operation.

The heater output control unit 203 includes a warming-up requirement output holding unit 213, a warming-up restriction unit 236, a heater suppliable electric power computation unit 237, and a normal control unit 303.

The normal control unit 303 includes a temperature requirement output computation unit 371, a maximum output computation unit 372, and a target output setting unit 373.

In order to appropriately maintain the temperature of the fuel cell stack 1, the temperature requirement output computation unit 371 computes an upper limit value of the electric power supplied to the cooling water heater 46 on the basis of the stack inlet water temperature.

Specifically, the temperature requirement output computation unit 371 stores a temperature requirement map in advance. The temperature requirement map has been generated to enable the temperature of the fuel cell stack 1 to be maintained at a temperature appropriate for electric power generation, e.g., 50° C. The temperature requirement map shows one-to-one correspondence between cooling water temperatures and requirement outputs from the cooling water heater 46 that have been set to adjust the temperature of the fuel cell stack 1 to a temperature appropriate for the electric power generation. The temperature requirement map is set on the basis of, for example, data of experiments and the like.

Upon obtaining a detected value of the stack inlet water temperature from the second water temperature sensor 48, the temperature requirement output computation unit 371 refers to the temperature requirement map, and calculates a requirement output corresponding to the detected value.

For example, when the stack inlet water temperature has reached the vicinity of 50° C., the temperature requirement output computation unit 371 calculates a requirement output of a small value, and outputs the calculated value to the target output setting unit 373 as an upper limit value of a temperature requirement output. In this way, the temperature of the fuel cell stack 1 can be maintained at a temperature appropriate for electric power generation.

The maximum output computation unit 372 computes the maximum output of the cooling water heater 46 that enables heating of cooling water without boiling the cooling water (an upper limit value of supplied electric power). The maximum output computation unit 372 calculates an upper limit value of the electric power supplied to the cooling water heater 46 on the basis of the rotational speed of the circulation pump 45. The higher the rotational speed of the circulation pump 45, the harder it is to boil cooling water with the cooling water heater 46. Thus, the maximum output computation unit 372 sets a larger upper limit value of the electric power supplied to the cooling water heater 46.

The maximum output computation unit 372 also corrects an upper limit value of the output of the cooling water heater 46 in accordance with an average value of the stack inlet water temperature and the stack outlet water temperature. Furthermore, the maximum output computation unit 372 corrects the upper limit value of the output of the cooling water heater 46 in accordance with the stack outlet water temperature.

For example, maximum output maps are recorded in the maximum output computation unit 372. The maximum output maps have been generated in one-to-one correspondence with average values of the stack inlet water temperature and the stack outlet water temperature. Each maximum output map shows correspondence between the rotational speed of the circulation pump 45 and a requirement output that has been set to prevent boiling of cooling water. The maximum output maps are set on the basis of, for example, data of experiments and the like.

Upon obtaining the rotational speed of the circulation pump 45 and the detected values of the stack inlet water temperature and the stack outlet water temperature, the maximum output computation unit 372 calculates an average value of the detected values of the stack inlet water temperature and the stack outlet water temperature. The maximum output computation unit 372 refers to a maximum output map corresponding to this average value, and outputs a requirement output corresponding to the detected value of the rotational speed of the circulation pump 45 to the target output setting unit 373 as the upper limit value of the heater output.

The warming-up requirement output holding unit 213 holds a lower limit value of a warming-up requirement output necessary for warming-up of the fuel cell stack 1. The lower limit value of the warming-up requirement output is, for example, 5 kW. The warming-up requirement output is output to the target output setting unit 373. Note that the lower limit value of the warming-up requirement output is set by the warming-up operation unit 210 when the fuel cell system 100 is activated.

The target output setting unit 373 selects the smallest one of the upper limit value of the temperature requirement output, the upper limit value of the heater output, and the lower limit value of the warming-up requirement output, and outputs the selected value to the warming-up restriction unit 236 as an upper limit value of heater supply electric power.

During the warming-up facilitation operation, the lower limit value of the warming-up requirement output is the smallest, and thus the target output setting unit 373 sets the lower limit value of the warming-up requirement output as the target value of the heater supply electric power.

The heater suppliable electric power computation unit 237 computes an upper limit value of the electric power suppliable to the cooling water heater 46 within the range of dischargeable electric power of the battery 55. The heater suppliable electric power computation unit 237 outputs the result of the computation to the warming-up restriction unit 236. Note that a detailed configuration of the heater suppliable electric power computation unit 237 will be described later with reference to FIG. 8.

The warming-up restriction unit 236 selects a smaller one of the target value of the heater supply electric power and the upper limit value of the electric power suppliable to the cooling water heater 46, and outputs the selected value to the cooling water heater instruction unit 250 as the target supply electric power to the cooling water heater 46.

For example, when the fuel cell stack 1 is stable during the warming-up facilitation operation, the electric power suppliable from the fuel cell stack 1 to the cooling water heater 46 exceeds the target value of the heater supply electric power, and thus the warming-up restriction unit 236 outputs the target value of the heater supply electric power.

On the other hand, when the fuel cell stack 1 has a poor I-V characteristic during the warming-up facilitation operation, the electric power suppliable to the cooling water heater 46 may fall below the target value of the heater supply electric power. In this case, the warming-up restriction unit 236 restricts the target supply electric power to the cooling water heater 46 to the upper limit value of the electric power suppliable to the cooling water heater 46.

The cooling water heater instruction unit 250 adjusts the output of the cooling water heater 46 in accordance with a detected value from a current sensor connected to the cooling water heater 46 and a detected value from the battery current sensor 58, so that the electric power supplied to the cooling water heater 46 matches the target supply electric power.

Figure 8:
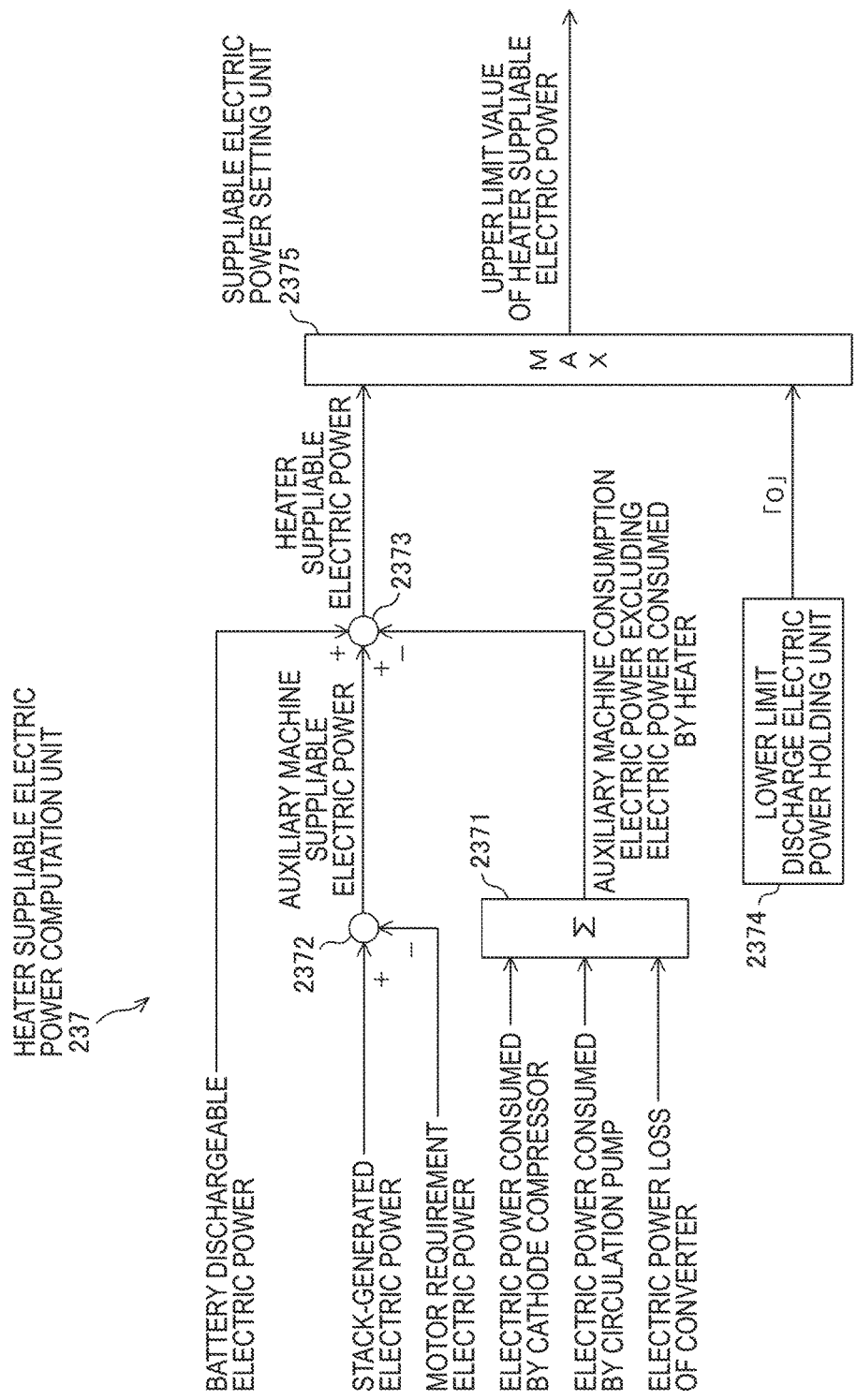
FIG. 8 is a block diagram showing a configuration of a heater suppliable electric power computation unit.

FIG. 8 is a block diagram showing a detailed configuration of the heater suppliable electric power computation unit 237.

The heater suppliable electric power computation unit 237 includes an addition unit 2371, a subtraction unit 2372, a computation unit 2373, a lower limit discharge electric power holding unit 2374, and a suppliable electric power setting unit 2375.

The addition unit 2371 adds the electric power consumed by the cathode compressor 24, the electric power consumed by the circulation pump 45, and the electric power loss of the DC-to-DC converter 56, thereby calculating the auxiliary machine consumption electric power excluding the electric power consumed by the cooling water heater 46. Note that the electric power consumed by the cathode compressor 24, the electric power consumed by the circulation pump 45, and the electric power loss of the DC-to-DC converter 56 are parameters that have been described with reference to FIG. 5.

When warming-up is restricted using the battery over-discharge prevention flag shown in FIGS. 4 and 6, the electric power consumed by the cathode compressor 24 denotes the electric power consumed while warming-up is restricted.

The subtraction unit 2372 calculates an auxiliary machine suppliable electric power that is suppliable to the auxiliary machines 57 by subtracting motor requirement electric power that is required by the driving motor 53 from the electric power generated by the fuel cell stack 1. Note that when the vehicle is not permitted to run during the warming-up facilitation operation, the motor requirement electric power indicates "0," and the electric power generated by the fuel cell stack 1 is supplied only to the auxiliary machines 57.

The computation unit 2373 adds the battery dischargeable electric power to the electric power suppliable from the fuel cell stack 1 to the cooling water heater 46, thereby computing an upper limit value of the electric power suppliable to the cooling water heater 46.

The battery dischargeable electric power is set on the basis of, for example, the SOC detected by the SOC sensor 62. When the SOC of the battery 55 falls below a discharge threshold for preventing over-discharge, the battery dischargeable electric power is set to "0."

Specifically, the computation unit 2373 calculates a stack suppliable electric power that is suppliable from the fuel cell stack 1 to the cooling water heater 46 by subtracting the auxiliary machine consumption electric power excluding the electric power consumed by the cooling water heater 46 from the auxiliary machine suppliable electric power calculated by the subtraction unit 2372.

Then, the computation unit 2373 calculates a heater suppliable electric power that is suppliable to the cooling water heater 46 by adding the battery dischargeable electric power to the stack suppliable electric power.

The lower limit discharge electric power holding unit 2374 holds a lower limit value of the electric power supplied to the cooling water heater 46. In the present embodiment, the lower limit value of the electric power supplied to the cooling water heater 46 is "0" and output to the suppliable electric power setting unit 2375.

When the heater suppliable electric power exceeds the lower limit value (0), the suppliable electric power setting unit 2375 outputs the heater suppliable electric power to the warming-up restriction unit 236 shown in FIG. 7.

As such, the heater suppliable electric power computation unit 237 calculates the upper limit value of the electric power suppliable to the cooling water heater 46 by adding the upper limit value of the electric power dischargeable from the battery 55 to the cooling water heater 46 to the upper limit value of the electric power suppliable from the fuel cell stack 1 to the cooling water heater 46.

In this way, even when there is a shortage in the electric power generated by the fuel cell stack 1 relative to the electric power consumed by the auxiliary machines 57, electric power can be supplied to the cooling water heater 46 within the range of the battery dischargeable electric power. Therefore, warming up the fuel cell stack 1 can be facilitated while suppressing over-discharge of the battery 55.

Furthermore, when the SOC of the battery 55 falls below the discharge threshold, the battery dischargeable electric power is set to "0," and thus over-discharge of the battery 55 can be prevented.

Figure 9:
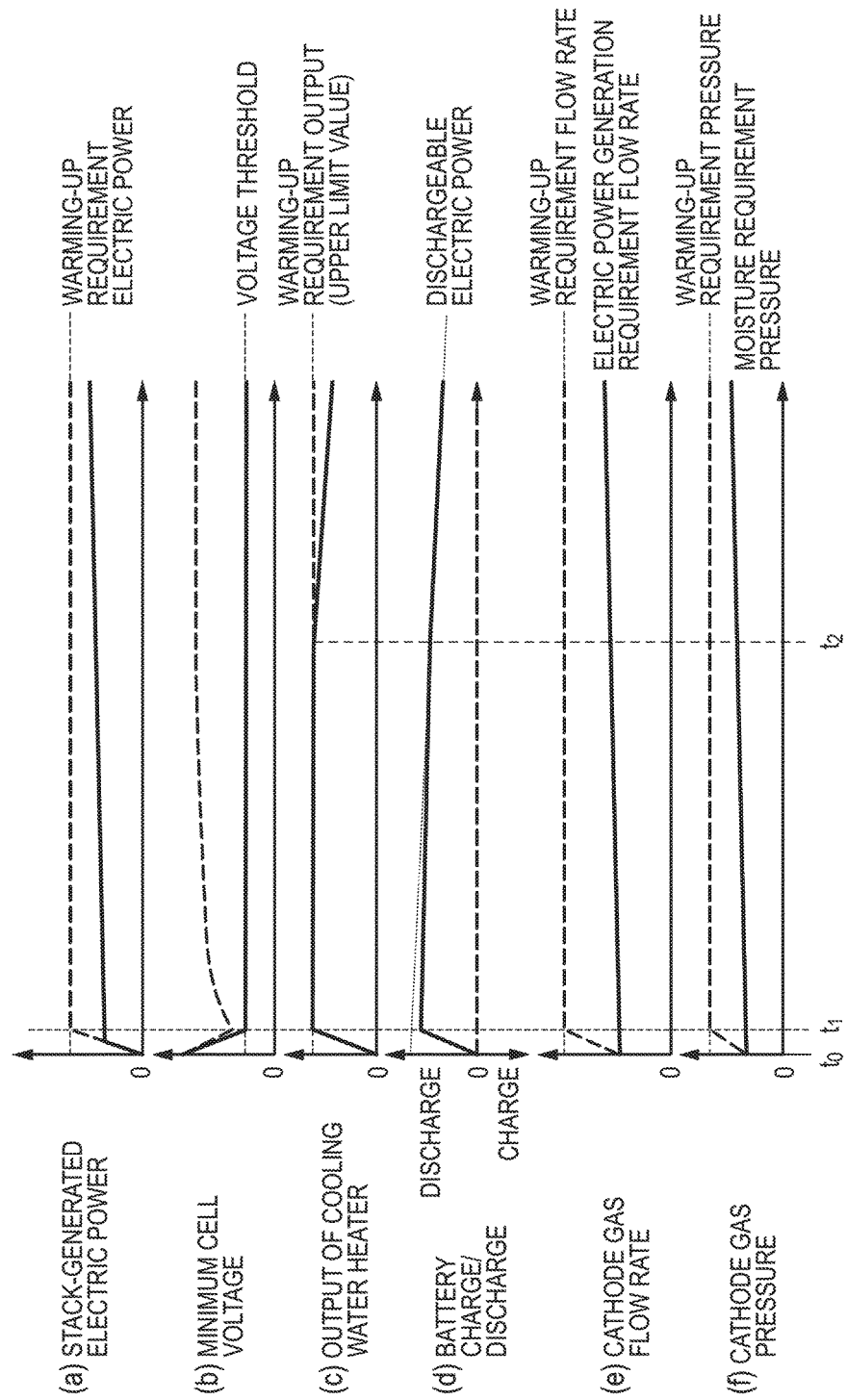
FIG. 9 is a time chart showing the operations while restricting warming-up in the fuel cell system.

FIG. 9 represents a time chart showing operations while restricting warming-up in the fuel cell system 100.

FIG. 9(a) shows the electric power generated by the fuel cell stack 1. FIG. 9(b) shows the lowest cell voltage (minimum cell voltage) among the cell voltages of the battery cells stacked in the fuel cell stack 1. FIG. 9(c) shows the output of the cooling water heater 46. FIG. 9(d) shows charge/discharge of the battery 55.

FIG. 9(e) shows the flow rate of cathode gas supplied from the cathode compressor 24 to the fuel cell stack 1. FIG. 9(f) shows the pressure of cathode gas flowing through an inlet hole of the WRD 27. Horizontal axes in FIGS. 9(a) to 9(f) represent a common time axis.

In FIGS. 9(a) to 9(f), solid lines denote waveforms obtained when the electric power consumed by the auxiliary machines 57 is restricted due to a poor I-V characteristic of the fuel cell stack 1 during the warming-up facilitation operation. On the other hand, dashed lines denote waveforms obtained when the fuel cell stack 1 generates electric power in a stable manner without any reduction in its output.

First of all, immediately before time t0, the controller 6 executes processing to activate the fuel cell stack 1 in response to a start request from the key sensor 63.

Specifically, the controller 6 supplies, to the fuel cell stack 1, the minimum anode gas pressure necessary for the fuel cell stack 1 to generate electric power by adjusting the opening degree of the anode pressure regulator valve 33. At the same time, the controller 6 controls the cathode gas pressure to match a pressure appropriate for electric power generation by adjusting the opening degree of the cathode pressure regulator valve 29, and supplies cathode gas to the fuel cell stack 1 at the minimum flow rate necessary for electric power generation.

At time t0, the processing to activate the fuel cell stack 1 is completed, and the stack inlet water temperature detected by the second water temperature sensor 48 is lower than the warming-up threshold; thus, the warming-up operation unit 210 of the controller 6 starts the warming-up facilitation operation.

Then, the converter control unit 220 of the controller 6 supplies the generated electric power from the fuel cell stack 1 to the auxiliary machines 57 by controlling the voltage of the DC-to-DC converter 56 at the fuel cell stack 1 side.

Specifically, in order to extract the requirement electric power necessary for the warming-up facilitation operation from the fuel cell stack 1, the converter control unit 220 reduces the output voltage of the fuel cell stack 1 through voltage control of the DC-to-DC converter 56.

With the reduction in the output voltage of the fuel cell stack 1, the output current extracted from the fuel cell stack 1 increases, and thus the electric power generated by the fuel cell stack 1 increases as shown in FIG. 9(a). Furthermore, with the reduction in the output voltage of the fuel cell stack 1, the minimum cell voltage of the battery cells also decreases as shown in FIG. 9 (b).

Note that in a normal state where the fuel cell stack 1 is stable, the electric power generated by the fuel cell stack 1 reaches the warming-up requirement electric power for the auxiliary machines 57, which is necessary for the warming-up facilitation operation, before the minimum cell voltage decreases to a voltage threshold as indicated by the dashed line in FIG. 9(b).

At time t1, as indicated by the solid line in FIG. 9(b), the minimum cell voltage of the battery cells decreases to the predetermined voltage threshold because the fuel cell stack 1 has a poor I-V characteristic and the electric power generated by the fuel cell stack 1 is lower than the warming-up requirement electric power. The voltage threshold is a lower limit value of a cell voltage that has been set to avoid an abnormal decline in the fuel cell stack 1 and is set on the basis of, for example, data of experiments and the like.

Once the minimum cell voltage has decreased to the predetermined voltage threshold, in order to prevent an extreme reduction in the output of the fuel cell stack 1, the controller 6 prohibits the voltage of the DC-to-DC converter 56 at the fuel cell stack 1 side from falling below the voltage threshold.

As a result, the generated electric power extracted from the fuel cell stack 1 is lower than the warming-up requirement electric power as shown in FIG. 9(a). In this case, as the fuel cell stack surplus generated electric power exceeds "0," the over-discharge prevention flag generation unit 500 of the controller 6 sets the battery over-discharge prevention flag to "1."

Accordingly, in the cathode gas flow rate control unit 201 shown in FIG. 4, the warming-up requirement flow rate is restricted to "0." Thus, among various requirement flow rates computed by the normal control unit 301, the calculated value of the electric power generation requirement flow rate is set as the target flow rate of cathode gas.

Therefore, as shown in FIG. 9(e), the cathode gas flow rate is maintained at the electric power generation requirement flow rate that is necessary for the fuel cell stack 1 to generate electric power. Consequently, the rotational speed of the cathode compressor 24 does not increase, and hence the electric power consumed by the cathode compressor 24 is restricted so as to be lower than the requirement electric power necessary for warming-up.

Furthermore, as the battery over-discharge prevention flag is set to "1," the warming-up requirement pressure is restricted to "0" in the cathode gas pressure control unit 202 shown in FIG. 6. Thus, among the requirement pressures computed by the normal control unit 302, the calculated value of the moisture requirement pressure is set as the target pressure of cathode gas.

Therefore, as shown in FIG. 9(f), the cathode gas pressure is maintained at a requirement pressure necessary for maintaining a favorable wetness state of the fuel cell stack 1. Consequently, torque generated in the cathode compressor 24 does not increase, and hence the electric power consumed by the cathode compressor 24 is restricted so as to be much lower than the requirement electric power necessary for warming-up.

By restricting the electric power consumed by the cathode compressor 24, electric power corresponding to the difference between the requirement electric power necessary for warming-up and the requirement electric power necessary for electric power generation can be supplied to the cooling water heater 46. In this way, the electric power supplied to the cooling water heater 46 can be increased to facilitate warming-up.

Furthermore, at time t1, even though the electric power consumed by the cathode compressor 24 is restricted, there is a shortage in the electric power suppliable from the fuel cell stack 1 to the cooling water heater 46 relative to the requirement electric power necessary for warming-up. For this reason, the converter control unit 220 of the controller 6 causes discharge of electric power from the battery 55 to the cooling water heater 46 through voltage control of the DC-to-DC converter 56.

As shown in FIGS. 9(c) and 9(d), because the electric power consumed by the cathode compressor 24 is restricted, the supply electric power necessary for the warming-up requirement output can be supplied to the cooling water heater 46 within the range of the dischargeable electric power of the battery 55.

Consequently, as shown in FIG. 9(c), the output of the cooling water heater 46 is controlled to match the value of the warming-up requirement output. As such, when the electric power generated by the fuel cell stack 1 is lower than the electric power consumed by the auxiliary machines 57 while restricting the electric power consumed by the cathode compressor 24, the converter control unit 220 causes discharge of electric power to the cooling water heater 46 within the range dischargeable from the battery 55. Therefore, the output of the cooling water heater 46 is not restricted to zero. This enables efficient warming-up of the fuel cell stack 1 while suppressing the occurrence of over-discharge of the battery 55.

Note that the heater suppliable electric power computation unit 237 shown in FIG. 8 outputs a sum total of the electric power dischargeable from the battery 55 to the auxiliary machines 57 and the electric power suppliable from the fuel cell stack 1 to the cooling water heater 46 as the heater suppliable electric power. In the heater output control unit 203 shown in FIG. 7, the heater suppliable electric power exceeds the warming-up requirement output, and thus the warming-up restriction unit 236 outputs the warming-up requirement output as the heater target supply electric power.

Thereafter, due to the self-heat generation by the fuel cell stack 1 associated with the electric power generation, and heating of cooling water with the cooling water heater 46, the fuel cell stack 1 is heated. This brings about restoration of the I-V characteristic of the fuel cell stack 1. With the restoration of the I-V characteristic of the fuel cell stack 1, the electric power generated by the fuel cell stack 1 gradually increases as shown in FIG. 9(a).

Meanwhile, with the discharge of current from the battery 55 to the cooling water heater 46, the upper limit value of the dischargeable electric power of the battery 55 gradually decreases as indicated by the dashed line in FIG. 9(d).

At time t2, with the reduction in the dischargeable electric power of the battery 55 shown in FIG. 9(d), it is no longer possible to secure the warming-up requirement output of the cooling water heater 46 within the range of the dischargeable electric power of the battery 55. In this case, the heater suppliable electric power falls below the warming-up requirement output in the heater output control unit 203. Accordingly, the warming-up restriction unit 236 switches the heater target supply electric power to the heater suppliable electric power.

As a result, with the reduction in the dischargeable electric power of the battery 55, the output of the cooling water heater 46 gradually decreases from the electric power generation requirement output as shown in FIG. 9(c). This allows supplementing the cooling water heater 46 with electric power from the battery 55 without exceeding the upper limit value of the battery dischargeable electric power. Therefore, the fuel cell stack 1 can be warmed up efficiently while suppressing discharge of the battery 55.

According to the second embodiment of the present invention, when electric power is supplied from the battery 55 to the auxiliary machines 57 during the warming-up facilitation operation, the battery over-discharge prevention flag is set to "1," and the electric power supplied to the cathode compressor 24 is restricted.

For example, when the battery over-discharge prevention flag indicates "1," the cathode gas flow rate control unit 201 reduces the target flow rate of cathode gas from the warming-up requirement flow rate necessary for warming-up to, for example, the electric power generation requirement flow rate included among various requirement flow rates computed by the normal control unit 301.

Also, when the battery over-discharge prevention flag indicates "1," the cathode gas pressure control unit 202 reduces the target pressure of cathode gas from the warming-up requirement pressure necessary for warming-up to, for example, the moisture requirement pressure included among various requirement pressures computed by the normal control unit 302.

As such, when electric power is supplied from the battery 55 to the auxiliary machines 57 during the warming-up facilitation operation, the target flow rate and the target pressure of cathode gas are suppressed, and hence the electric power supplied to the cathode compressor 24 can be restricted.

Consequently, facilitation of warming up the fuel cell stack 1 can be prioritized while suppressing the occurrence of over-discharge of the battery 55.

In the present embodiment, while restricting warming-up, the target flow rate and the target pressure of cathode gas are switched to a requirement flow rate and a requirement pressure computed by the normal control units 301 and 302, respectively. Thus, the present embodiment can be realized by a simple control logic.

In the present embodiment, the heater output control unit 203 restricts the output of the cooling water heater 46 when electric power is discharged from the battery 55 to the cooling water heater 46 while restricting the electric power supplied to the cathode compressor 24 during the warming-up facilitation operation.

That is to say, the heater output control unit 203 restricts the output of the cooling water heater 46 when the discharge electric power supplied from the battery 55 to the cooling water heater 46 exceeds the battery dischargeable electric power while restricting the electric power consumed by the cathode compressor 24 during the warming-up facilitation operation.

By thus delaying the timing of restriction on the cooling water heater 46 compared to the timing of restriction on the cathode compressor 24, warming-up by the cooling water heater 46 can be prioritized while suppressing the occurrence of over-discharge of the battery 55.

As the warming-up effect of increasing the temperature of the fuel cell stack 1 with the cooling water heater 46 is more efficient than the warming-up effect achieved by increasing the electric power consumed by the cathode compressor 24, electric power of the battery 55 can be used efficiently.

In the above-described example of the second embodiment, both of the target flow rate and the target pressure of cathode gas are simultaneously restricted when restricting the electric power consumed by the cathode compressor 24. However, no limitation is intended in this regard.

A description is now given of other methods of restricting the electric power consumed by the cathode compressor 24 according to third and fourth embodiments of the present invention. Note that a fuel cell system according to the third and fourth embodiments is basically configured in the same manner as the fuel cell system 100 shown in FIG. 1.

Third Embodiment

In the third embodiment of the present invention, the warming-up restriction unit 230 restricts only the target pressure of cathode gas, and does not restrict the target flow rate of cathode gas. For example, the warming-up restriction unit 230 changes the warming-up restriction value set in the warming-up restriction value holding unit 234 of the cathode gas pressure control unit 202 in accordance with an upper limit value of a compressor suppliable electric power.

The compressor suppliable electric power denotes electric power that can be supplied only from the fuel cell stack 1 to the cathode compressor 24 while the generated electric power is supplied to the auxiliary machines 57 excluding the cathode compressor 24 during the warming-up facilitation operation.

Specifically, the warming-up restriction unit 230 calculates the auxiliary machine consumption electric power other than the electric power consumed by the cathode compressor 24 by adding the electric power consumed by the circulation pump 45, the electric power consumed by the cooling water heater 46, and the electric power loss of the DC-to-DC converter 56, which have been described with reference to FIG. 5. The warming-up restriction unit 230 calculates the compressor suppliable electric power by subtracting the auxiliary machine consumption electric power excluding the electric power consumed by the cathode compressor 24 from the electric power generated by the fuel cell stack 1.

The warming-up restriction unit 230 sets a larger warming-up restriction value in the warming-up restriction value holding unit 234 for a higher compressor suppliable electric power. In this way, the target pressure of cathode gas can be set to be higher than the requirement pressures computed by the normal control unit 302 within the range of the electric power generated by the fuel cell stack 1.

Figure 10:
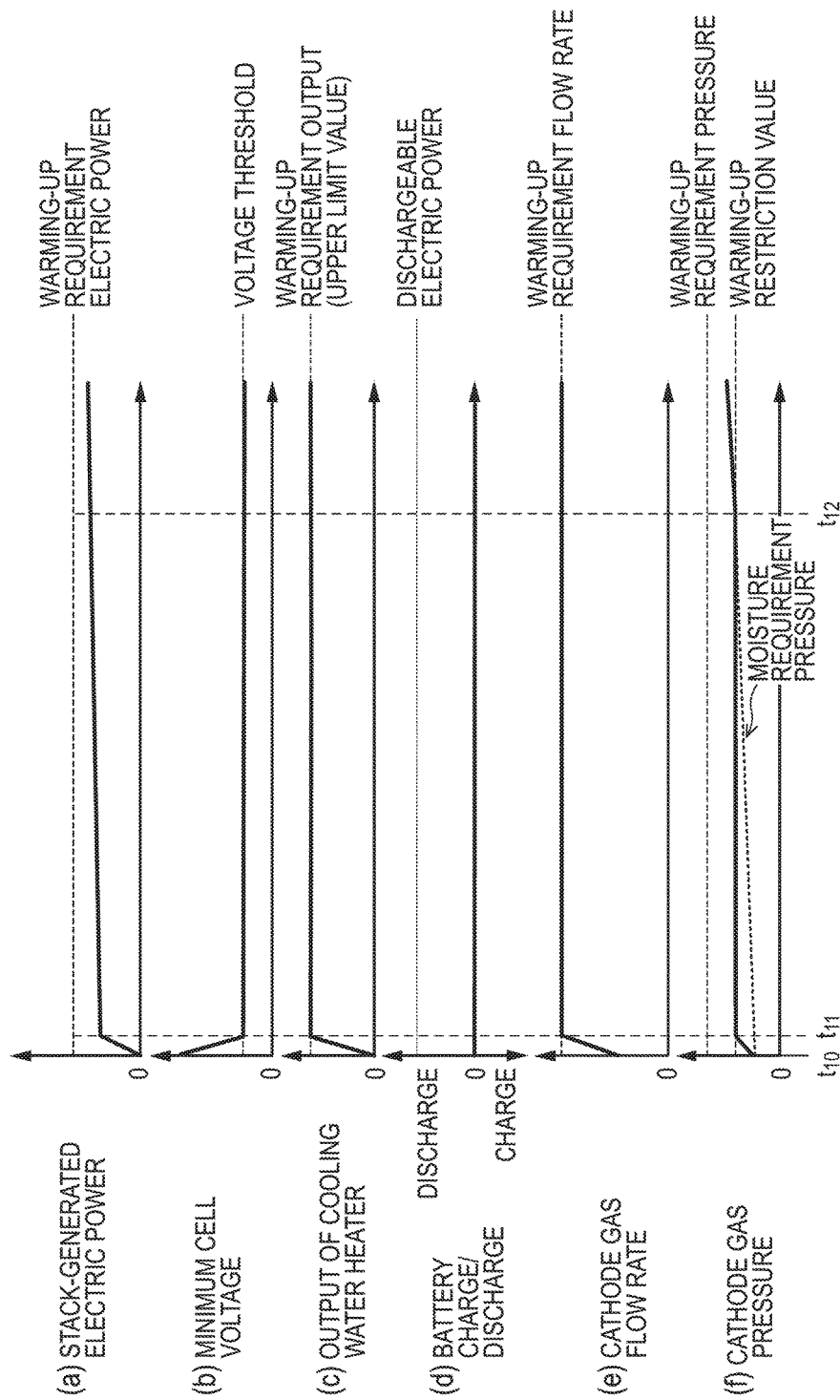
FIG. 10 is a time chart showing the operations while restricting warming-up in a fuel cell system according to a third embodiment.

FIG. 10 is a time chart showing operations while restricting warming-up in the third embodiment. Note that vertical axes in FIGS. 10(a) to 10(f) are the same as the vertical axes in FIGS. 9(a) to 9(f), respectively, and horizontal axes in FIGS. 10(a) to 10(f) represent a common time axis.

At time t10, similarly to FIGS. 9(a) to 9(f), the warming-up operation unit 210 of the controller 6 starts the warming-up facilitation operation as the stack inlet water temperature detected by the second water temperature sensor 48 is lower than a predetermined warming-up temperature.

Then, the converter control unit 220 of the controller 6 reduces the output voltage of the fuel cell stack 1 by controlling the voltage of the DC-to-DC converter 56. Consequently, the output current of the fuel cell stack 1 increases, and thus the electric power generated by the fuel cell stack 1 increases as shown in FIG. 10(a). Furthermore, with the reduction in the output voltage of the fuel cell stack 1, the minimum cell voltage of the battery cells also decreases as shown in FIG. 10(b).

At time t11, similarly to FIGS. 9(a) to 9(f), the electric power generated by the fuel cell stack 1 does not reach the warming-up requirement electric power as shown in FIG. 10(a), even though the minimum cell voltage has decreased to the voltage threshold as shown in FIG. 10(b). Consequently, in the over-discharge prevention flag generation unit 500 of the controller 6, the fuel cell stack surplus generated electric power exceeds "0," and the battery over-discharge prevention flag is set to "1."

At this time, the warming-up restriction unit 230 calculates the compressor suppliable electric power from the fuel cell stack 1, computes the warming-up restriction value of the cathode gas pressure on the basis of the compressor suppliable electric power, and sets the result of the computation in the warming-up restriction value holding unit 234 shown in FIG. 6. Accordingly, the cathode gas pressure control unit 202 switches the target pressure of cathode gas from the warming-up requirement pressure to the warming-up restriction value based on the compressor suppliable electric power.

Therefore, as shown in FIG. 10(f), the cathode gas pressure is restricted to the warming-up restriction value, which is larger than the moisture requirement pressure. In this way, the amount of reduction in the electric power consumed by the cathode compressor 24 can be kept to the minimum within the range of the electric power generated by the fuel cell stack 1. Furthermore, as the electric power consumed by the cathode compressor 24 is restricted, the supply electric power necessary for the warming-up requirement output is supplied only from the fuel cell stack 1 to the cooling water heater 46 without using supplemental electric power from the battery 55 as shown in FIGS. 10(c) and 10(d).

Thereafter, with the restoration of the I-V characteristic of the fuel cell stack 1, the electric power generated by the fuel cell stack 1 gradually increases as shown in FIG. 10(a). Accordingly, the moisture requirement pressure, which has been described with reference to FIG. 6, increases as well.

Therefore, at time t12, the moisture requirement pressure exceeds the warming-up restriction value, and thus the cathode gas pressure control unit 202 switches the target pressure of cathode gas to the moisture requirement pressure.

As such, in the third embodiment, when restricting the electric power supplied to the cathode compressor 24 during the warming-up facilitation operation of the fuel cell stack 1, only the cathode gas pressure is restricted and the cathode gas flow rate is not restricted.

In general, when the fuel cell system 100 is activated at a subzero temperature, the amount of saturated water vapor inside the fuel cell stack 1 decreases. Consequently, water vapor associated with the electric power generation is condensed and turns into condensed water. As the condensed water is easily reserved in the electrolyte membranes, there is a possibility that so-called flooding occurs.

Solutions to the foregoing issue include increasing the amount of water vapor carried from the fuel cell stack 1 by increasing the flow rate of cathode gas supplied to the fuel cell stack 1, and suppressing the generation of condensed water by decreasing the cathode gas pressure.

In view of this, when restricting the electric power consumed by the cathode compressor 24, the present embodiment restricts the cathode gas pressure, and does not restrict the cathode gas flow rate. This makes it possible to suppress flooding, which easily occurs in the case of subzero activation, while suppressing over-discharge of the battery 55.

Fourth Embodiment

In the fourth embodiment of the present invention, the warming-up restriction unit 230 restricts the target flow rate of cathode gas while restricting the target pressure of cathode gas. For example, the warming-up restriction unit 230 changes the warming-up restriction value set in the warming-up restriction value holding unit 232 of the cathode gas flow rate control unit 201 in accordance with the upper limit value of the compressor suppliable electric power described in the third embodiment.

Specifically, the warming-up restriction unit 230 calculates a requirement electric power of a case where the target flow rate and the target pressure of cathode gas are restricted to a requirement flow rate (e.g., electric power generation requirement flow rate) and a requirement pressure (e.g., moisture requirement pressure) in the normal control units 301 and 302, respectively.

When the compressor suppliable electric power exceeds the requirement electric power, the warming-up restriction unit 230 sets the warming-up restriction value of the cathode gas flow rate to be high in accordance with a magnitude of surplus electric power. In this way, the target flow rate of cathode gas can be set to be higher than the requirement flow rate while restricting the target pressure of cathode gas to the requirement pressure.

Figure 11:
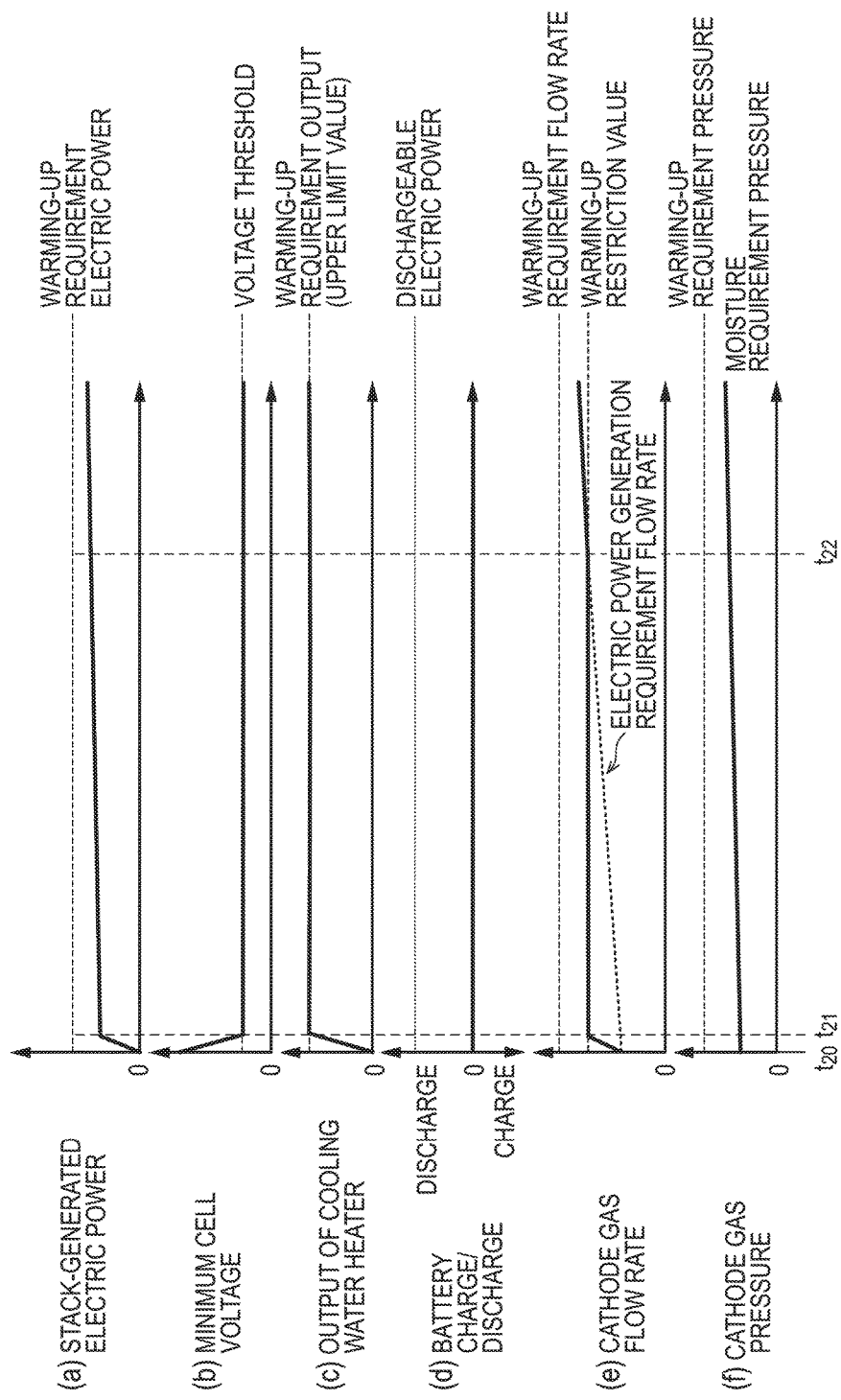
FIG. 11 is a time chart showing the operations while restricting warming-up in a fuel cell system according to a fourth embodiment.

FIG. 11 is a time chart showing operations while restricting warming-up in the fourth embodiment. Note that vertical axes in FIGS. 11(a) to 11(f) are the same as the vertical axes in FIGS. 9(a) to 9(f), respectively, and horizontal axes in FIGS. 11(a) to 11(f) represent a common time axis.

At time t20, similarly to FIGS. 9(a) to 9(f), the warming-up operation unit 210 of the controller 6 starts the warming-up facilitation operation as the stack inlet water temperature detected by the second water temperature sensor 48 is lower than the predetermined warming-up temperature.

Then, the converter control unit 220 of the controller 6 reduces the output voltage of the fuel cell stack 1 by controlling the voltage of the DC-to-DC converter 56. Consequently, the output current of the fuel cell stack 1 increases, and thus the electric power generated by the fuel cell stack 1 increases as shown in FIG. 11(a). Furthermore, with the reduction in the output voltage of the fuel cell stack 1, the minimum cell voltage of the battery cells also decreases as shown in FIG. 11(b).

At time t21, the electric power generated by the fuel cell stack 1 does not increase to the requirement electric power necessary for the warming-up facilitation operation as shown in FIG. 11(a), even though the minimum cell voltage has decreased to the voltage threshold as shown in FIG. 11(b). Consequently, in the over-discharge prevention flag generation unit 500 of the controller 6, the fuel cell stack surplus generated electric power exceeds "0," and the battery over-discharge prevention flag is set to "1."

At this time, the warming-up restriction unit 230 calculates the compressor suppliable electric power from the fuel cell stack 1. Then, the warming-up restriction unit 230 sets the warming-up restriction value of the cathode gas flow rate in the warming-up restriction value holding unit 232 in accordance with the difference between the compressor suppliable electric power and a requirement electric power of a case where the warming-up restriction values of the cathode gas pressure and the cathode gas flow rate are set to "0." Accordingly, the cathode gas flow rate control unit 201 switches the target flow rate of cathode gas from the warming-up requirement flow rate to the warming-up restriction value based on the compressor suppliable electric power.

Therefore, as shown in FIG. 11(e), the flow rate of cathode gas increases to the warming-up restriction value, which is larger than the electric power generation requirement flow rate. In this way, the amount of reduction in the electric power consumed by the cathode compressor 24 can be kept to the minimum within the range of the electric power generated by the fuel cell stack 1. As the electric power consumed by the cathode compressor 24 is restricted, the supply electric power necessary for the warming-up requirement output is supplied only from the fuel cell stack 1 to the cooling water heater 46 without using supplemental electric power from the battery 55 as shown in FIGS. 11(c) and 11(d).

Thereafter, with the restoration of the I-V characteristic of the fuel cell stack 1, the electric power generated by the fuel cell stack 1 gradually increases as shown in FIG. 11(a). Accordingly, the electric power generation requirement flow rate, which has been described with reference to FIG. 4, increases as well.

At time t22, the electric power generation requirement flow rate exceeds the warming-up restriction value, and hence the cathode gas flow rate control unit 201 switches the target flow rate of cathode gas to the electric power generation requirement flow rate.

As such, in the fourth embodiment, when restricting the electric power supplied to the cathode compressor 24 during the warming-up facilitation operation of the fuel cell stack 1, the cathode gas flow rate is restricted while restricting the cathode gas pressure to a requirement pressure in the normal control unit 301.

According to the fourth embodiment, when restricting the electric power consumed by the cathode compressor 24, the cathode gas flow rate is restricted after restricting the cathode gas pressure. In this way, the amount of reduction in the electric power consumed by the cathode compressor 24 can be increased compared to the third embodiment.

Furthermore, as restriction of the cathode gas pressure is prioritized over restriction of the cathode gas flow rate, discharge of the battery 55 can be suppressed while suppressing the occurrence of flooding.

As such, according to the third and fourth embodiments, the warming-up restriction unit 230 increases the warming-up restriction value for the electric power supplied to the cathode compressor 24 in accordance with the compressor suppliable electric power. In this way, the amount of self-heat generation by the fuel cell stack 1 can be increased and a warming-up period can be shortened compared to the second embodiment.

Although the embodiments of the present invention have been described thus far, the above embodiments merely illustrate a part of example applications of the present invention, and the specific configurations of the above embodiments are not intended to limit the technical scope of the present invention.

In the above-described examples of the present embodiments, the cathode gas flow rate control unit 201 restricts the warming-up requirement flow rate of cathode gas upon discharge of electric power from the battery 55 to the auxiliary machines 57. However, no limitation is intended in this regard.

For example, the cathode gas flow rate control unit 201 may restrict the warming-up requirement flow rate in accordance with the amount of discharge electric power supplied from the battery 55 to the auxiliary machines 57.

Specifically, the warming-up restriction unit 230 reduces the warming-up restriction value set in the warming-up restriction value holding unit 232 as the SOC of the battery 55 decreases. Alternatively, the warming-up restriction unit 230 may obtain a cumulative amount of discharge electric power supplied from the battery 55 to the auxiliary machines 57 using the battery current sensor 58 and the battery voltage sensor 59, and reduce the warming-up restriction value as the cumulative amount of discharge electric power increases.

In this way, warming-up of the fuel cell stack 1 can be prioritized by increasing the electric power consumed by the cathode compressor 24 without causing over-discharge of the battery 55. Similarly, the cathode gas pressure control unit 202 can also prioritize warming-up of the fuel cell stack 1 by reducing the warming-up requirement pressure in accordance with the amount of electric power supplied from the battery 55 to the auxiliary machines 57.

In the above-described examples of the present embodiments, a compressor is used as a gas supply unit that supplies cathode gas to the fuel cell stack 1. However, for example, a blower or a pump equipped with an actuator may be used in place of the cathode compressor 24.

Although a fuel cell system that does not circulate anode gas has been described in the present embodiments, the present embodiments are also applicable to a fuel cell system that circulates anode gas. For example, a gas circulation pump may be provided in a circulation passage that diverges from the anode gas discharge passage 35 and merges with the anode gas supply passage 32, and the flow rate in the gas circulation pump can be set to be higher than the requirement flow rate necessary for electric power generation during the warming-up facilitation operation. With this configuration, while restricting warming-up, the electric power consumed by the gas circulation pump is restricted before restricting the electric power consumed by the cooling water heater 46. In this case also, warming-up of the fuel cell stack 1 can be facilitated while suppressing discharge of the battery 55.

Note that the above embodiments can be combined as appropriate.

The present application claims the benefit of priority from Japanese Patent Application No. 2013-211314, filed in the Japan Patent Office on Oct. 8, 2013, the disclosure of which is incorporated herein by reference in its entirety.

The invention claimed is:

1. A fuel cell system, comprising:
a battery configured to reserve electric power;
auxiliary machines including an actuator and a heater, the actuator being driven to cause at least one gas of anode gas and cathode gas to be supplied to a fuel cell configured to generate electric power using the gas, the heater being configured to heat cooling water circulating in the fuel cell;
a warming-up operation unit configured to adjust operations of the auxiliary machines so as to realize output of the fuel cell such that a predetermined electric power is extracted;
a discharge control unit configured to supply the electric power from the battery to the auxiliary machines when electric power generated by the fuel cell is lower than electric power consumed by the auxiliary machines; and
an auxiliary machine restriction unit configured to reduce electric power consumed by the actuator, before reducing electric power consumed by the heater, when the discharge control unit supplies the electric power from the battery to the auxiliary machines in a case where the fuel cell is warmed up using the heater.

2. The fuel cell system according to claim 1, further comprising
a normal control unit configured to control electric power supplied to the actuator in accordance with a state of electric power generation by the fuel cell, wherein
when the generated electric power is lower than the electric power consumed by the auxiliary machines while warming up the fuel cell, the auxiliary machine restriction unit reduces the electric power consumed by the actuator to the supplied electric power controlled by the normal control unit.

3. The fuel cell system according to claim 1, wherein
when the discharge control unit supplies the electric power of the battery to the auxiliary machines, the auxiliary machine restriction unit reduces electric power supplied to the actuator as an amount of the electric power discharged from the battery to the auxiliary machines increases.

4. The fuel cell system according to claim 1, wherein
while restricting the electric power consumed by the actuator, the auxiliary machine restriction unit reduces electric power supplied to the heater when the electric power supplied from the battery to the auxiliary machines is higher than electric power dischargeable from the battery.

5. The fuel cell system according to claim 1, wherein
while reducing the electric power consumed by the actuator, the auxiliary machine restriction unit does not reduce electric power discharged from the battery to the heater under the discharge control unit when the generated electric power is lower than the electric power consumed by the auxiliary machines.

6. The fuel cell system according to claim 1, wherein
in order to reduce electric power consumed by a gas supply unit configured to supply cathode gas by driving the actuator, the auxiliary machine restriction unit reduces pressure of cathode gas supplied to the fuel cell and then reduces a flow rate of the cathode gas.

7. A method of controlling a fuel cell system including auxiliary machines and a battery, the auxiliary machines including an actuator and a heater, the actuator being driven to cause at least one gas of anode gas and cathode gas to be supplied to a fuel cell configured to generate electric power using the gas, the heater being configured to heat cooling water circulating in the fuel cell, and the battery reserving electric power, the method comprising:
   adjusting operations of the auxiliary machines so as to realize output of the fuel cell such that a predetermined electric power is extracted;
   supplying the electric power from the battery to the auxiliary machines when electric power generated by the fuel cell is lower than electric power consumed by the auxiliary machines; and
   reducing electric power consumed by the actuator, before reducing electric power consumed by the heater, when the electric power is supplied from the battery to the auxiliary machines in a case where the fuel cell is warmed up using the heater.

* * * * *